US012056103B2

(12) United States Patent
Kandasamy et al.

(10) Patent No.: US 12,056,103 B2
(45) Date of Patent: Aug. 6, 2024

(54) DATABASE USAGE FOOTPRINT MONITORING PLATFORM

(71) Applicant: Target Brands, Inc., Minneapolis, MN (US)

(72) Inventors: Saravanan Kandasamy, Karnataka (IN); Prajakta Deshpande, Karnataka (IN); Deepa Sarasamma, Minneapolis, MN (US); Payal Verma, Karnataka (IN); Sudha Adarsh, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 76 days.

(21) Appl. No.: 17/859,857

(22) Filed: Jul. 7, 2022

(65) Prior Publication Data

US 2024/0012795 A1     Jan. 11, 2024

(51) Int. Cl.
| | | |
|---|---|---|
| *G06F 7/02* | (2006.01) | |
| *G06F 16/00* | (2019.01) | |
| *G06F 16/21* | (2019.01) | |
| *G06F 16/27* | (2019.01) | |
| *G06N 20/00* | (2019.01) | |

(52) U.S. Cl.
CPC ............ *G06F 16/217* (2019.01); *G06F 16/27* (2019.01); *G06N 20/00* (2019.01)

(58) Field of Classification Search
CPC .... G06F 16/217; G06F 16/27; G06F 11/3409; G06F 18/217; G06N 20/00
See application file for complete search history.

(56) References Cited

U.S. PATENT DOCUMENTS

| | | |
|---|---|---|
| 8,645,276 B2 | 2/2014 | Wong et al. |
| 8,880,461 B2 | 11/2014 | Jenkins et al. |
| 9,020,868 B2 | 4/2015 | Elkins et al. |
| 9,210,141 B2 | 12/2015 | Anderson et al. |

(Continued)

OTHER PUBLICATIONS

Database Performance Monitor; Database performance monitoring and optimization for traditional, open-source, and cloud-native databases; Start Free Trial; Accessed Nov. 7, 2021; 5 pgs.

(Continued)

*Primary Examiner* — Bruce M Moser
(74) *Attorney, Agent, or Firm* — Merchant and Gould, PC

(57) ABSTRACT

The present application describes a database performance and usage footprint monitoring and analysis platform and related user application, which may provide insights across the whole of an enterprise's database inventory to increase visibility, accountability, and efficiency. The platform and related application may provide insight into enterprise database footprint and utilization, including displaying the data and associated metrics and analysis in a customizable interface. The platform may ingest and capture performance data and events to provide resource properties and cost analyses across enterprise groups. Future performance may be predicted by the platform, future data trends identified, and platform may provide usage prediction, perform root cause analysis to recommend action items, and provide alerts, among other functions. These improvements may reduce operational downtime, reactive events and efforts, and information gaps; enable informed business decisions; and make more efficient use of database resources.

21 Claims, 18 Drawing Sheets

(56) References Cited

U.S. PATENT DOCUMENTS

| | | |
|---|---|---|
| 9,495,651 B2 | 11/2016 | O'Sullivan et al. |
| 10,193,775 B2 | 1/2019 | Fletcher et al. |
| 11,106,442 B1 | 8/2021 | Hsiao et al. |
| 11,429,577 B2 * | 8/2022 | Ma .................. G06F 16/953 |
| 2011/0055109 A1 | 3/2011 | Mcgrath |
| 2013/0006680 A1 | 1/2013 | O'Sullivan et al. |
| 2021/0103617 A1 | 4/2021 | Jha et al. |

OTHER PUBLICATIONS

Database performance monitoring with PRTG, PAESSLER—the Monitoring Experts (Products/IT Monitoring); Accessed Nov. 7, 2021; 10 pgs.

DATADOG—Log Management, Analytics, and Security Monitoring Built for Scale; Accessed Nov. 7, 2021; 11 pgs.

DATADOG—Instantly See into All Your Systems, Apps, and Services; Accessed Nov. 7, 2021; 54 pgs.

DbWatch AS—Database Monitoring—Monitor and manage your entire database farm; Accessed Nov. 7, 2021; 4 pgs.

SnapLogic—Information Technology—Bringing Automation to Business Governance by IT; Accessed Nov. 7, 2021; 7 pgs.

SnapLogic—Welcome to the Automated Enterprise (Automation Summit 2021); Accessed Nov. 7, 2021; 6 pgs.

Splunk—Prevent outages with modern IT management; Accessed Nov. 7, 2021; 11 pgs.

Splunk—Predictive Analytics—Prevent incidents with machine learning, predictive alerting and auto-remediation; Accessed Nov. 7, 2021; 6 pgs.

Splunk—Server and VM Monitoring; Accessed Nov. 7, 2021; 9 pgs.

Pneuron—Rapidly connect diverse assets into intelligent workflows using the Pneuron platform's microservices-style architecture; Accessed Nov. 7, 2021; 5 pgs.

Pneuron—Optimization M&A Inegration—Pneuron Distributed Platform; Accessed Nov. 7, 2021; 9 pgs.

Pneuron—the Pneuron Distributed Environment—a new Paradigm for the Distributed Environment; Accessed Nov. 7, 2021; 21 pgs.

SolarWinds Worldwide, LLC—SQL Sentry (Database performance monitoring for the Data Platform, with fast root cause analysis and visibility across the Microsoft data estate; Accessed Nov. 7, 2021; 7 pgs.

SolarWinds Worldwide, LLC—Database Performance Analyzer Supported Databases (Cross-platform database performance tuning and optimization); Accessed Nov. 7, 2021; 3 pgs.

TIBCO EBX™ Software—Industry Leading MDM Software; Accessed Nov. 7, 2021; 7 pgs.

* cited by examiner

300

Receive data associated with a plurality of heterogeneous databases, at least a portion of one or more of the plurality of heterogeneous databases being allocated to one or more of a plurality of functional groups within an enterprise organization, each of the plurality of functional groups having a specified database requirement — 302

Analyze the received data, including calculating usage metrics associated with the plurality of heterogeneous databases — 304

Generate a user interface that displays a comparison of the usage metrics across a plurality of time periods, wherein at least a portion of the metrics are associated with the one or more of the plurality of functional groups — 306

```
┌─────────────────────────────────────────────────────────────────────┐
│ Receive data associated with a plurality of heterogeneous databases,│
│ at least a portion of one or more of the plurality of heterogeneous │── 302
│ databases being allocated to one or more of a plurality of          │
│ functional groups within an enterprise organization, each of        │
│ the plurality of functional groups having a specified database      │
│ requirement                                                         │
└─────────────────────────────────────────────────────────────────────┘
                                  ↓
┌─────────────────────────────────────────────────────────────────────┐
│ Analyze the received data, including calculating usage metrics      │── 304
│ associated with the plurality of heterogeneous databases            │
└─────────────────────────────────────────────────────────────────────┘
                                  ↓
┌─────────────────────────────────────────────────────────────────────┐
│ Calculate a predicted value associated with the received data       │── 502
└─────────────────────────────────────────────────────────────────────┘
                                  ↓
┌─────────────────────────────────────────────────────────────────────┐
│ Generate a user interface that displays the predicted value and a   │
│ comparison of the usage metrics across a plurality of time periods, │── 504
│ wherein at least a portion of the metrics are associated with the   │
│ one or more of the plurality of functional groups                   │
└─────────────────────────────────────────────────────────────────────┘
```

Receive data associated with a plurality of heterogeneous databases, at least a portion of one or more of the plurality of heterogeneous databases being allocated to one or more of a plurality of functional groups within an enterprise organization, each of the plurality of functional groups having a specified database requirement — 302

Analyze the received data, including calculating usage metrics associated with the plurality of heterogeneous databases — 304

Determining a recommended action associated with the metrics — 602

Automatically initiating the carrying out of the recommended action — 702

Generate a user interface that displays the recommended action and a comparison of the usage metrics across a plurality of time periods, wherein at least a portion of the metrics are associated with the one or more of the plurality of functional groups — 604

FIG. 7

DATABASE USAGE FOOTPRINT MONITORING PLATFORM

BACKGROUND

An enterprise may include different groups, such as different business departments or platforms (e.g. engineering, marketing, operations, or accounting), and each of these groups may have different requirements regarding data storage and usage. An enterprise may employ various types of databases, sometimes from different vendors, to meet the varied requirements of its different groups. These different databases often store and process different types of data and provide different metrics, and they often do not or cannot communicate with each other. These factors can make it difficult for an enterprise to monitor and compare current database usage and performance across the different databases. This lack of visibility impacts the ability of the enterprise to make data-driven improvements, respond to events, or to predict future outcomes. Additionally, over time, the requirements of different groups may change, and so they may use their allocated database resources inefficiently while not having access to database resources that may be helpful to them.

Improving the ability to monitor and compare various metrics across different heterogenous databases may provide a number of advantages for multiple users. For example, providing an overview of the current database utilization, cost, and performance, may give users an effective way to view and compare data associated with databases that otherwise may not be displayed on the same interface. Analyzing this data to predict growth, datapoints, and identify trends over a time period can help business users make key business decisions based on data-driven analyses. For example, if a usage analysis shows that usage of a particular database resource has decreased and is predicted to continue to decrease, and a cost analysis shows that the cost of the database resource is not decreasing, then a business decision may be made to scale back, reallocate, or eliminate that database resource. Providing trends of database metrics, database performance, data comparisons, and generating data-based recommendations may help enterprise engineers to enhance migration strategies, speed up proactive solutioning, reduce downtime, minimize analysis time, and reduce human-monitoring needs. In some examples, data-based recommendations may be automatically carried out, thus reducing maintenance, IT, and engineering costs and time. Identifying events relating to database performance and utilization and alerting a user of the event can reduce downtime and improve performance. These improvements may ultimately lead to operational savings, increased group and user productivity, cost avoidance, and reduction in repair time. Additionally, by improving data reliability and enhanced response time, the experience of guest users of applications that rely on such underlying data resources can be improved.

SUMMARY

In general, this innovation relates to a database performance and usage footprint monitoring and analysis platform and related user application, which may provide insights across the whole of an enterprise's database inventory to increase visibility, accountability, and efficiency. The platform, and related application described herein, may provide insight into enterprise database footprint and utilization, including displaying the data and associated metrics and analysis in a customizable interface. The database usage monitoring platform may ingest and capture performance data and events to provide resource properties and cost analyses across enterprise groups. The database performance and usage footprint monitoring and analysis platform may also analyze data using functions such as event correlation, pattern discovery, and performance comparison. Future performance may also be predicted by the database performance and usage footprint monitoring and analysis platform, future data trends identified, and the database performance and usage footprint monitoring and analysis platform may also provide usage prediction, perform root cause analysis to recommend action items, and provide alerts, among other functions. These improvements may reduce operational downtime, reduce reactive events and efforts associated with them, reduce information gaps, enable the making of informed business decisions, and make more efficient use of database resources.

Accordingly, the present application describes, in some examples, a system comprising a processor and a memory coupled to the processor, the memory storing instructions that, when executed by the processor, perform operations. The performed operations may include receiving usage data associated with a plurality of heterogeneous databases from across an enterprise organization over a plurality of time periods, where at least a portion of one or more of the plurality of heterogeneous databases are allocated to one or more of a plurality of functional groups within the enterprise organization. In some examples, each of the plurality of functional groups has a specified database requirement. In some examples, for each time period, the instructions may include analyzing the received data (including calculating usage metrics associated with the plurality of heterogeneous databases) and storing the calculated usage metrics in a database in association with a capture time of the usage data. In some examples, a user interface may be generated that displays a comparison of the usage metrics across a plurality of time periods, each time period being represented by a different captured time of the usage data, where at least a portion of the metrics are associated with the one or more of the plurality of functional groups. In some examples, instructions may further include identifying an alert event in the usage metrics, the alert event being generated in response to detection of a performance or cost condition identified based on a comparison of usage metrics across the plurality of time periods, the plurality of the heterogeneous databases, or the plurality of functional groups, and outputting one or more automated recommendations via the user interface, the one or more automated recommendations including a recommendation to adjust a footprint of a particular type of database from among the heterogeneous databases allocated to a particular group of the plurality of functional groups.

In some examples, the present application describes a method comprising receiving usage data associated with a plurality of heterogeneous databases from across an enterprise organization over a plurality of time periods, where at least a portion of one or more of the plurality of heterogeneous databases are allocated to one or more of a plurality of functional groups within the enterprise organization. In some examples, each of the plurality of functional groups has a specified database requirement. In some examples, for each time period the method may comprise analyzing the received data (including calculating usage metrics associated with the plurality of heterogeneous databases) and storing the calculated usage metrics in a database in association with a capture time of the usage data. In some examples, a user interface may be generated that displays a comparison of the usage metrics across a plurality of time periods, each time period being represented by a different captured time of the usage data. In some examples, at least a portion of the metrics are associated with the one or more of the plurality of functional groups. In some examples, the method comprises calculating a predicted value for the usage metrics and outputting one or more automated recommendations via the user interface, the one or more automated recommendations being based, at least in part, on the predicted value.

In some examples, the present application describes a method comprising receiving usage data associated with a plurality of heterogeneous databases from across an enterprise organization over a plurality of time periods, where at least a portion of one or more of the plurality of heterogeneous databases are allocated to one or more of a plurality of functional groups within the enterprise organization. In some examples, each of the plurality of functional groups has a specified database requirement. In some examples, for each time period the method comprises analyzing the received data (including calculating usage metrics associated with the plurality of heterogeneous databases) and storing the calculated usage metrics in a database in association with a capture time of the usage data. In some examples, the method comprises identifying an alert event in the usage metrics, the alert event being generated in response to detection of a performance or cost condition identified based on a comparison of usage metrics across the plurality of time periods, the plurality of the heterogeneous databases, or the plurality of functional groups. In some examples, the method comprises determining one or more automated recommendations via the user interface, the one or more automated recommendations including a recommendation to adjust a footprint of a particular type of database from among the heterogeneous databases allocated to a particular group of the plurality of functional groups. In some examples, the method comprises automatically initiating the carrying out of the one or more automated recommendations and generating a user interface that displays the one or more automated recommendations and a comparison of the usage metrics across a plurality of time periods, each time period being represented by a different captured time of the usage data, where at least a portion of the metrics are associated with the one or more of the plurality of functional groups.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 3 illustrates an example method for receiving and analyzing metrics and data across a plurality of heterogenous databases allocated to different groups within an enterprise, according to an example.

FIG. 5 further illustrates the example method of FIG. 3, wherein a predicted value associated with received data is calculated, according to an example.

FIG. 7 further illustrates the example method of FIG. 3C, wherein the recommended action is automatically carried out, according to an example.

DETAILED DESCRIPTION

Figure 1:
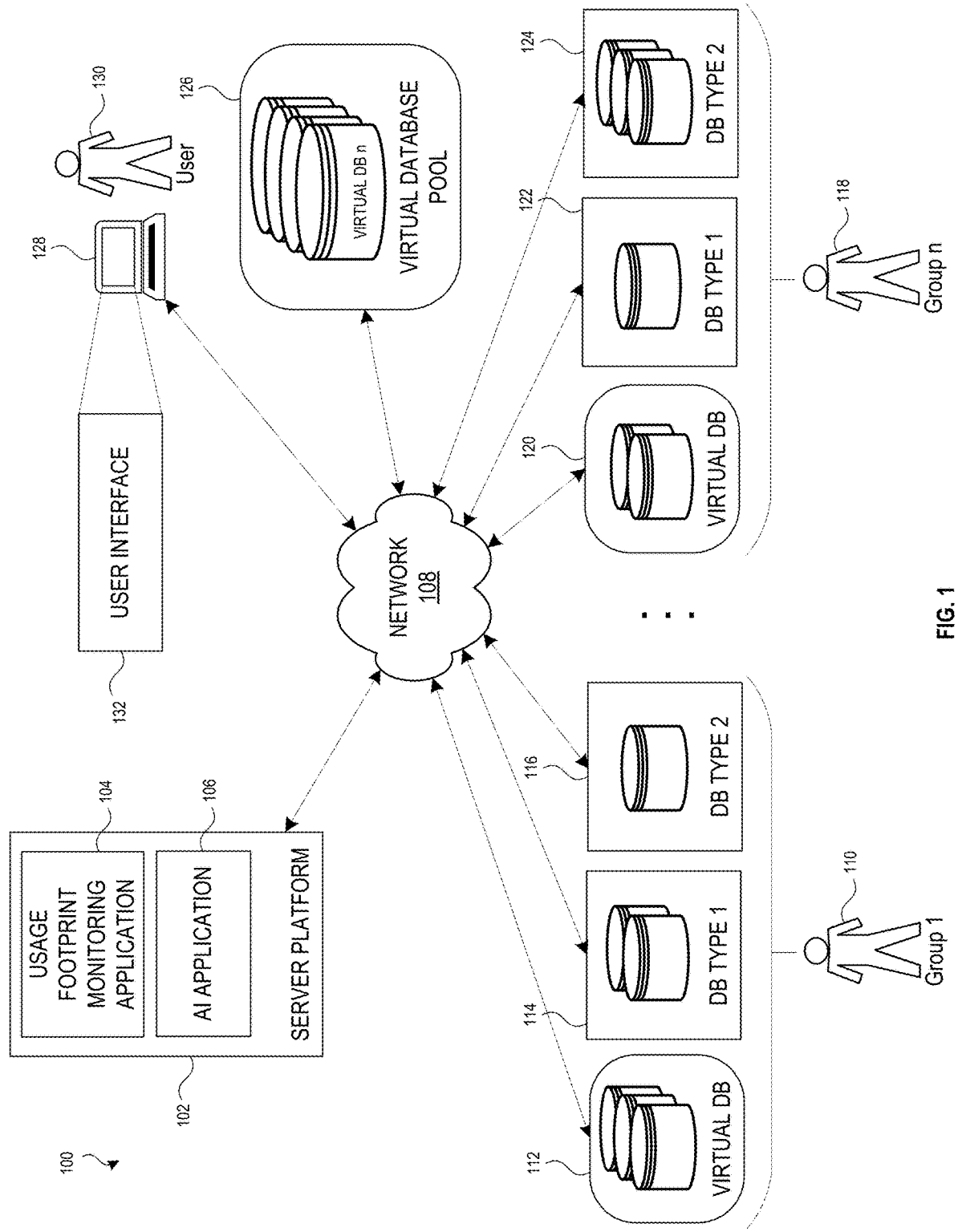
FIG. 1 illustrates an example system for receiving and analyzing metrics and data across a plurality of heterogenous databases allocated to different groups within an enterprise, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An enterprise may comprise different groups, such as different business departments or platforms (e.g. engineering, marketing, operations, or accounting), and each of these groups may have different requirements regarding data storage and usage. The groups may utilize different types of databases to meet their individual requirements. These different databases often store and process different types of data and provide different metrics (such as different performance datapoints, for example), and they often do not or cannot communicate with each other. These factors, and others, may make it difficult for an enterprise to monitor and compare current database usage and performance (for example, comparing usage, cost patterns, event insights, or other attributes) across the different databases. This lack of visibility impacts the ability of the enterprise to make data-driven improvements, respond to events, or to predict future outcomes. Additionally, over time, the requirements of different groups may change, and so they may use currently allocated database resources inefficiently, and there may be no visibility of the issue or a way to address that change in need.

In current solutions, database monitoring applications may be tailored to monitoring performance of a specific type or set of types of database, but not across all heterogeneous databases that an enterprise utilizes. Current solutions also do not adequately provide trends and predictive analyses across all these database types on a per-group level. A solution which integrated both user interface feature and downstream functional changes (such as making a recommendation to reallocate database resources among different types of database) would also be beneficial over current solutions.

The present disclosure describes a system and methods for providing insights to an enterprise about a plurality of heterogeneous databases, understanding and predicting resource utilization, augmenting capacity planning, and providing proactive recommendations and alerts to increase performance and operational efficiency. A database performance and usage footprint monitoring and analysis platform may receive data associated with different heterogeneous databases, which may relate to the utilization, data storage, performance, or cost of the database, among other factors. These databases may be of different types and may be supplied by different vendors internal to or external to the enterprise. The data gathered from the database may include data such as utilization, performance, storage capacity, or other metrics. The data may also be relevant to specific enterprise groups to whom a segment (or a whole) of a database is allocated. The database performance and usage footprint monitoring and analysis platform may ingest this data and present it (for example via graphs and charts) to a user via a user interface. The database performance and usage footprint monitoring and analysis platform may also calculate present values, summaries, metrics, and calculations from the data and display those to the user. The database performance and usage footprint monitoring and analysis platform may detect events from the data. The database performance and usage footprint monitoring and analysis platform may provide alerts to the user of an event or specific datapoint. The database performance and usage footprint monitoring and analysis platform may analyze the data to display trends of data, predict future values, and recommend actions to the user (such as allocating more or less of a particular database to a particular enterprise group based on utilization trends, for example). Some actions may be automated by the database performance and usage footprint monitoring and analysis platform. In some examples, analysis may be performed by an artificial intelligence application.

The database performance and usage footprint monitoring and analysis platform may collect and aggregate large volumes of data generated by multiple heterogeneous databases and database performance-monitoring tools. The database performance and usage footprint monitoring and analysis platform may filter out "noise" from true "signals" to allow for the identifications of events, trends, and patterns. For example, adaptive ratings of performance metrics can be used to reduce false negatives and false positives in the data (e.g., false alerting regarding database resource usage issues or performance issues). Data can be correlated and normalized by the database performance and usage footprint monitoring and analysis platform, and presented to and made accessible to users via a user interface.

The database performance and usage footprint monitoring and analysis platform may perform continuous, automated assessment, or it may perform an assessment at the initiation of a user. The platform can also predict performance and behavior trends, and may provide proactive alerts for monitoring, allowing for proactive measures to take place instead of reactive responses. Actions may be recommended based on the assessment and analysis, which may be automatically carried out in some examples. Additionally, the platform provides a visual output for the user. This output may show technology footprint distribution, portfolio tech distribution, database platform spread, technology growth analysis including projected growth, database resource demand analyses, service and resource utilization, cost analyses, performance metrics, performance comparisons, and recommendations and remediations, among others. In some examples, data from heterogeneous (or homogeneous) databases may be consolidated to provide a unified view at an enterprise hierarchy level, which may better enable the enterprise to make efficient and beneficial technical and business decisions.

These and other examples will be explained in more detail below with respect to FIG. 1-FIG. 14.

FIG. 1 illustrates an example system 100 for receiving and analyzing metrics and data across a plurality of heterogenous databases allocated to different groups within an enterprise, according to an example. As will be described in more detail below, the system 100 includes a server platform 102, a database (DB) usage footprint monitoring platform 104, an artificial intelligence (AI) application 106, a network 108, a Group 1 110, a Group n 118, a virtual database pool 126, a device 128 associated with a user 130, a user interface 132, and various databases allocated to Group 1 110 and Group n 118: virtual databases (DB) 112, 120, databases (DB) type 1 114, 122, databases (DB) type 2 116, 124.

In an example, the database performance and usage footprint monitoring and analysis platform 104, located within server platform 102, receives data and/or metrics from the one or more of the various databases allocated to Group 1 110 and Group n 118 (for example, virtual databases (DB) 112, 120, databases (DB) type 1 114, 122, databases (DB) type 2 116, 124). In some examples, database performance and usage footprint monitoring and analysis platform 104 may receive data and/or metrics from other programs and services, where the data and/or metrics are related to the various databases. In some examples, the server system may be a standalone server system, or may be a distributed or shared-services based implementation managed within an enterprise, and may be implemented using one or more computing systems having access to usage records across the data storage footprint of the enterprise. Database performance and usage footprint monitoring and analysis platform 104 may include sub-processors, tools, and services, to aid in the intake, processing, analysis, and display of the data and metrics, as will be discussed further regarding FIG. 2. The various databases may communicate the data and metrics to database performance and usage footprint monitoring and analysis platform 104 via network 108. In some examples, network 108 may include a computer network, an enterprise intranet, the Internet, a LAN, a Wide Area Network (WAN), wireless transmission mediums, wired transmission mediums, other networks, and combinations thereof. Although network 108 is shown as a single network in FIG. 1, this is shown as an example and the various communications described herein may occur over the same network or a number of different networks. In some examples, the data and/or metrics may include, among others, database utilization (in an example, how much of an allocation of database type 1 122 is being utilized by Group n 118), cost (for example, the licensing cost for virtual database 112), database storage capacity (for example, how much of the storage capacity of database type 2 116 (or an allocated portion of database type 2 116) is filled and how much remains available), and/or performance (in an example, how fast is database type 1 122 operating and were any error or events received from database type 2 124).

In an example, an enterprise comprises a plurality of groups, such as Group 1 110 and Group n 118, which may be functional groups within an enterprise, which relate to different enterprise departments, teams, or platforms (e.g. engineering, marketing, operations, human resources, information technology, accounting, or others), and each of these functional groups may have different requirements regarding data storage and data usage. To meet these requirements, various databases of different types or categories may be allocated to each of the functional groups, and each group may be allocated all or a portion of an allocated database. The various databases of different types often store and process different types of data and provide different metrics (such as different performance datapoints, for example), maybe supplied from different vendors, and in some examples, the heterogeneous databases cannot communicate with each other. In some examples, various databases are virtual (e.g. cloud-based); in other examples, they are network or drive-based. Examples of databases may include, but are not limited to: SAP, Elasticsearch, Cassandra, Mongo DB, Redis, Postgres, Oracle, and Graph DB. These various databases may store data in different formats, for example, SQL or NoSQL. In an example, the various databases may output some of their own metrics (such as performance). In an example, Group 1 110 may have allocated to it: all or a portion of three databases of the type virtual database 112, all or a portion of two databases of the database type 1 114, and all or part of a single database of the database type 2 116. Group n 118 (an enterprise may have any number of groups) may have different needs and requirements than Group 1 110, and may have allocated to it: all or a portion of two databases of the type virtual database 120, all or a portion of a single database of the database type 1 122, and all or part of three databases of the database type 2 124. In some examples, the requirements of Group 1 110 and Group n 118 may change over time, as they may need more or less of a particular type of database or database type.

In some examples, upon receiving the data and/or metrics, database performance and usage footprint monitoring and analysis platform 104 may process the data and/or metrics for display. It may produce tables, graphs, or other appropriate display means of current data and/or metrics, which it may communicate vi network 108 to a device 128 so that the current data and/or metrics may be displayed to a user 130 via a user interface 132. In some examples, the device 128 may be a desktop computer, a laptop computer, a tablet, a cell phone, a smart TV, a smart wearable device, or other appropriate electronic device which is capable of displaying the user interface 132. In an example, user 130 is an engineer, operator, maintenance worker, or other agent of the enterprise. In an example, user interface 132 is a web application. In other examples, user interface 132 is a device application. In some examples, the displayed data and/or metrics may be associated with particular enterprise groups, such as Group 1 110 and Group n 118. In some examples, user interface 132 allows user 130 to interact with the displayed tables, graphs, or other appropriate display means to better view the data based on user 130's needs and preferences (for example, filtering, sorting, customizing views and charts, or toggling different options on and off). In an example, user interface 132 may display to user 130 a visual display which includes a graph depicting and comparing how much data each enterprise group currently has stored on each database.

In some examples, database performance and usage footprint monitoring and analysis platform 104 may recognize or detect one or more events associated with the data and/or metrics. In some examples, events may relate to storage capacity, errors, database function, database performance, or others. For example, database performance and usage footprint monitoring and analysis platform 104 may receive an error message from a database, saying that the database is not functioning properly. In that example, database performance and usage footprint monitoring and analysis platform 104 may recognize this error message as an event. In another example, database performance and usage footprint monitoring and analysis platform 104 may receive data regarding a database which is close to its maximum capacity. In that example, database performance and usage footprint monitoring and analysis platform may detect that high capacity as an event. In some examples, all or part of recognizing an event may be done by an artificial intelligence application 106. In some examples, detected events may be displayed to the user via user interface 132.

In some examples, database performance and usage footprint monitoring and analysis platform 104 may analyze the data and/or metrics, and in some examples, database performance and usage footprint monitoring and analysis platform 104 may calculate new metrics. In some examples, all or part of the analysis may be done by one or more sub-processors, tools, services, or calculators within the database performance and usage footprint monitoring and analysis platform 104. In some examples, all or part of the analysis may be done by an artificial intelligence application 106 (for example, an artificial intelligence engine, machine learning component, etc.). In some examples, artificial intelligence application 106 may be located within the database performance and usage footprint monitoring and analysis platform 104, on server platform 102, or external to server platform 102. In some examples, calculated new metrics may be displayed to the user via user interface 132. In some examples, analysis of the data and/or metrics may include generating trends (for example, whether Group 1 has increased its usage of a particular database in its allocation of database type 1 114 by a steady percentage for a determined time period), predicting/forecasting a future value (for example, predicting growth of a specific database or database type based on past data for growth of that database, and displaying that predicted value to user 130 on a graph showing the current and predicted value on user interface 132), computing various costs (for example, calculating the running cost per hour over a specified time period for the databases of virtual database 112, database type 1 114, and database type 2 116 which are allocated to Group 1 110 (or multiple groups) and displaying those costs as a graph or chart on user interface 132), identifying patterns (for example, identifying that the utilization of a particular database allocated to Group 1 110 by Group 1 110 increases and decreases in a cyclical manner every year), or other analyses. In some examples, reports of analysis results may be displayed to the user via user interface 132.

In some examples, database performance and usage footprint monitoring and analysis platform 104 may filter out "noise" from true "signals" in the received data and/or metrics to allow for the identifications of events, trends, and patterns. For example, adaptive ratings of performance metrics can be used to reduce false negatives and false positives in the data (e.g., false alerting regarding database resource usage issues or performance issues). In some examples, data can be correlated and normalized by the database performance and usage footprint monitoring and analysis platform 104. In some examples, all or part of filtering out "noise" may be done by an artificial intelligence application 106.

In some examples, database performance and usage footprint monitoring and analysis platform 104 may generate an alert (e.g. a real-time alert) to provide to user 130. In an example, the alert may be based off of current data or an event (for database performance and usage footprint monitoring and analysis platform 104 may receive data regarding a database which is close to its maximum capacity, and may generate an alert that the database is almost full). In an example, the alert may be based off of a predicted value (for example, database performance and usage footprint monitoring and analysis platform 104 may determine a predicted usage of a database allocation for Group 1 110 which will exceed the current allocation of Group 1 110, and may generate an alert that Group 1 110 may exceed its allocation soon). In an example, an alert may be base off of a generated recommended action (for example, if an action is recommended to increase the allocation of a particular database of database type 1 114 to Group 1 110, an alert may be generated that recommends that user 130 increase the allocation of the particular database of database type 1 114 to Group 1 110). In an example, an alert may be provided to user 130 by database performance and usage footprint monitoring and analysis platform 104. In other examples, an alert may be provided to user 130 through integration of database performance and usage footprint monitoring and analysis platform 104 with other enterprise alert and monitoring tools. In some examples, an alert may be provided to user 130 via user interface 132. In other examples, an alert may be provided to user 130 via a different application. In an example, an alert may be provided to user 130 and other users also. In some examples, an alert may be provided to user 130 as soon as it is generated. In other examples, an alert may be provided to user 130 at a specified delayed time after it is generated (for example, an alert may be generated that does not require immediate action, and may be delayed and only delivered to user 130 during pre-determined working hours or waking hours). In some examples, all or part of generating an alert may be done by an artificial intelligence application 106.

In some examples, database performance and usage footprint monitoring and analysis platform 104 may generate a recommended action. In an example, a recommended action (new allocation, etc.) may be based, at least in part, on one or more of the following: current received data and/or metrics, a predicted/forecasted value, a detected event, a determined trend, or a recognized pattern. In an example, a recommended action may be presented to user 130 via a display through user interface 132. In some examples, a recommended action may be presented to user 130 as an alert. In some examples, a recommended action may include moving data from one database to another, allocating more or less of a database to an enterprise group, allocating or un-allocating a database to an enterprise group, modifying software or hardware, decommissioning or scaling (upscaling or downscaling) a database on the enterprise or group level, perform maintenance on systems, among others. For example, in an analysis of data may show that utilization of a database of Type 1 114 is trending downward. In this example, database performance and usage footprint monitoring and analysis platform 104 may generate a recommended action to decrease the amount of storage space on that database which is allocated to Group 1 110, having the added benefit of freeing up extra storage space on that database for another Group n 118 to utilize. In some examples, all or part of generating a recommended action may be done by an artificial intelligence application 106.

In some examples, database performance and usage footprint monitoring and analysis platform 104 may generate a recommended action and automatically carry out the recommended action. In some examples, all or part of generating a recommended action and automatically carrying out the recommended action may be done by an artificial intelligence application 106. In some examples, a report regarding a recommended action which was automatically carried out may be displayed to the user via user interface 132. In an example, database performance and usage footprint monitoring and analysis platform 104 may generate a recommended action to decrease the amount of storage space on a database of Type 1 114 which is allocated to Group 1 110. In that example, database performance and usage footprint monitoring and analysis platform 104 may automatically decrease the amount of storage space on database of Type 1 114 that is allocated to Group 1 110. In an example, database performance and usage footprint monitoring and analysis platform 104 may generate a recommended action that a Group n 118 requires additional database space. In that example, database performance and usage footprint monitoring and analysis platform 104 may automatically allocate all or part of a virtual database (DB) n, which is part of virtual database pool 126, to the Group n 118. In some examples, virtual database pool 126 may comprise one or more virtual databases n of similar or heterogeneous types. In some examples, virtual database pool 126 may include one or more enterprise data sources which may include one or more cloud storage providers.

In some examples, database performance and usage footprint monitoring and analysis platform 104 may perform continuous, automated receipt and/or analysis of data and/or metrics. In other examples, database lens platform 104 may perform receipt and/or analysis of data and/or metrics at the initiation of user 130. In some examples, the initiation by user 130 may be via user interface 132.

Figure 2:
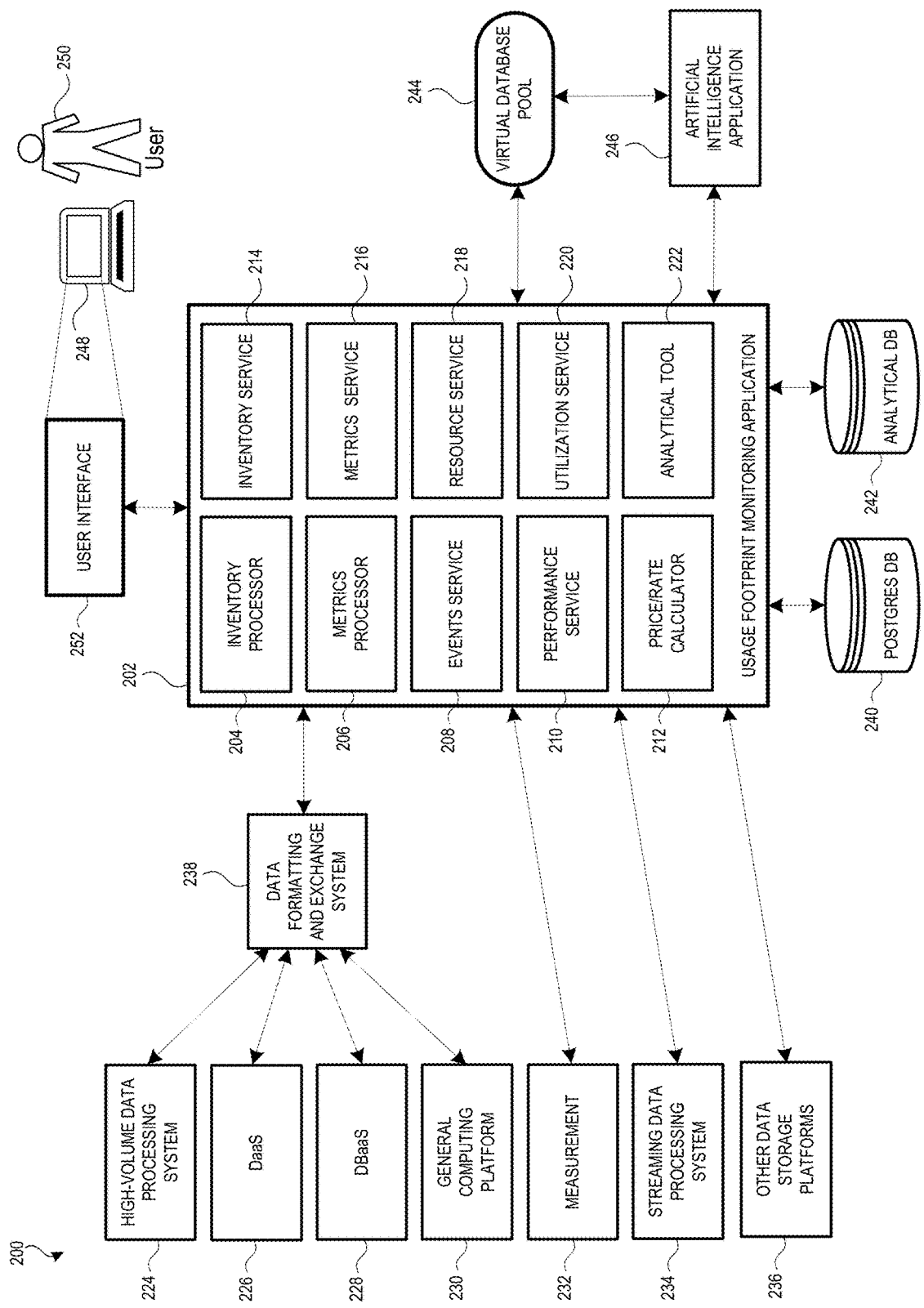
FIG. 2 illustrates an example system for receiving and analyzing metrics and data across a plurality of heterogenous databases allocated to different groups within an enterprise, comprising a database performance and usage footprint monitoring and analysis platform and a user interface, according to an example.

FIG. 2 illustrates an example system for receiving and analyzing metrics and data across a plurality of heterogenous databases allocated to different groups within an enterprise, comprising a database performance and usage footprint monitoring and analysis platform and a user interface, according to an example. As will be described in more detail below, the system 200 includes a database (DB) usage footprint monitoring platform 202 which may include sub-processors, tools, services, or calculators such as an inventory processor 204, metrics processor 206, events service 208, performance service 210, price/rate calculator 212, inventory service 214, metrics service 216, resource service 218, utilization service 220, and analytical tool 222. The system 200 may also include various databases and other programs and services, where the data and/or metrics are related to the various databases, such as a high-volume data processing system 224, DaaS (Data as a Service) 226, DBaaS (Database as a Service) 228, a general computing platform 230, a measurement 232, a streaming data processing system 234, and other data storage platforms 236. The system 200 may also include a data formatting and exchange system 238, a postgres database (DB) 240, an analytical database (DB) 242, a virtual database pool 244, an artificial intelligence application 246, a device 248, a user 250, and user interface 252.

In some examples, a plurality of heterogeneous databases, which may be allocated in whole or in part to a plurality of enterprise groups, may reside in DaaS 226, DBaaS 228, general computing platform 230, other data storage platforms 236, or another suitable system. The various heterogeneous databases may store and process different types of data, may be supplied from different vendors, and in some examples, the heterogeneous database cannot communicate with each other. In some examples, various databases are virtual (e.g. cloud-based); in other examples, they are network or drive-based. Examples of databases may include, but are not limited to: SAP, Elasticsearch, Cassandra, Mongo DB, Redis, Postgres, Oracle, and Graph DB. These various databases may store data in different formats, for example, SQL or NoSQL. In an example, the various databases may output some of their own metrics (such as performance).

In an example, database performance and usage footprint monitoring and analysis platform 202 receives data (in some examples, pertaining to an inventory of data stored in the databases) and/or metrics associated with one or more of the plurality of heterogeneous databases into inventory processor 204 and/or a metrics processor 206. In some examples, data and/or metrics sources may include one or more of the following: high-volume data processing system 224 (in some examples, relating to unstructured data); DaaS 226; DBaaS 228; general computing platform 230; measurement 232 (in some examples, a storage system for metrics available from various databases); streaming data processing system (in some examples, may provide performance data relating to its own performance or the performance of other databases) 234, and other data storage platforms 236. In some examples, these data and/or metrics sources may reside within the same enterprise system as the database performance and usage footprint monitoring and analysis platform 202, and in other examples, one or more of these data and/or metrics sources may reside outside of the same enterprise system. In an example, data and/or metrics are passed through data formatting and exchange system 238 (for example, from high-volume data processing system 224, DaaS 226, DBaaS 228, and general computing platform 230) before receipt by database performance and usage footprint monitoring and analysis platform 202. In some examples, inventory processor 204 and/or metrics processor 206 may filter "noise" out of the received data and/or metrics.

In some examples, database performance and usage footprint monitoring and analysis platform 202 may perform continuous, automated receipt and/or analysis of data and/or metrics. In other examples, database lens platform 202 may perform receipt and/or analysis of data and/or metrics at the initiation of user 250. In some examples, the initiation by user 250 may be via user interface 252.

In an example, data and/or metrics (and in some examples, associated statistics) that are received by database performance and usage footprint monitoring and analysis platform 202 may be stored in postgres database 240.

In an example, events service 208 may detect or recognize an event from the received data and/or metrics. In an example, performance data may be received, analyzed, or parsed for display and comparison via performance service 210. In an example, cost and rate calculations related to the received data and/or metrics may be calculated via price/rate calculator 212. In an example, inventory and storage data associated with the data and/or metrics may be received, analyzed, or parsed for display and comparison via inventory service 214. In an example, inventory statistics may also be calculated by inventory service 214. In an example, metrics data associated with the data and/or metrics may be received, analyzed, or parsed for display and comparison via metrics service 216. In an example, metrics statistics may also be calculated by metrics service 216. In an example, resource service 218 may receive, analyze, calculate, or parse for display and comparison data, metrics, and/or statistics which may be associated with various heterogeneous database resources and, in some examples, a plurality of enterprise groups. In an example, utilization service 220 may receive, analyze, calculate, or parse for display and comparison data, metrics, and/or statistics which may be associated with the utilization of various heterogeneous database resources by one or more of a plurality of enterprise groups to which all or some of the heterogenous database resources may be allocated to.

In an example, analytical tool 222 may receive, analyze, calculate, or parse for display and comparison data, generate trends, predict/forecast a future value, compute various costs, identify patterns, filter "noise" out of the data and/or metrics, generate an alert to be provided to user 250, determine a recommended action, automatically carry out a determined recommended action, or other analyses. In some examples, data and/or metrics utilized by analytical tool 222, as well as any data generated by analytical tool 222 may be stored in analytical database (DB) 242. In some examples, data and/or metrics utilized and/or generated by any of the sub-processors, tools, services, or calculators within the database performance and usage footprint monitoring and analysis platform 202 may be stored in analytical database 242. In some examples, the inventory stored in analytical database 242 may be accessible to some or all of: database performance and usage footprint monitoring and analysis platform 202, analytical tool 222, the sub-processors, tools, services, or calculators within the database performance and usage footprint monitoring and analysis platform 202, and artificial intelligence application 246.

In some examples, some or all of the aforementioned abilities and analysis of the analytical tool 222 may be performed or aided by artificial intelligence application 246. In some examples, artificial intelligence application 246 may comprise an artificial intelligence engine, or machine learning component. In some examples, artificial intelligence application 246 may be located within database performance and usage footprint monitoring and analysis platform 202; in other examples, artificial intelligence application 246 may be located external to server platform 202. In some examples, artificial intelligence application 246 may be in communication with a virtual database pool 244. In some examples, database performance and usage footprint monitoring and analysis platform 202 may be in communication with a virtual database pool 244.

In some examples, data, metrics, statistics, alerts, and generated analyses may be displayed on a device 248 to a user 250 via user interface 252. In some examples, device 248 may be a desktop computer, a laptop computer, a tablet, a cell phone, a smart TV, a smart wearable device, or other appropriate electronic device which is capable of displaying the user interface 252. In an example, user 250 is an engineer, operator, maintenance worker, or other agent of the enterprise. In an example, user interface 252 is a web application. In other examples, user interface 252 is a device application.

Figure 2A:
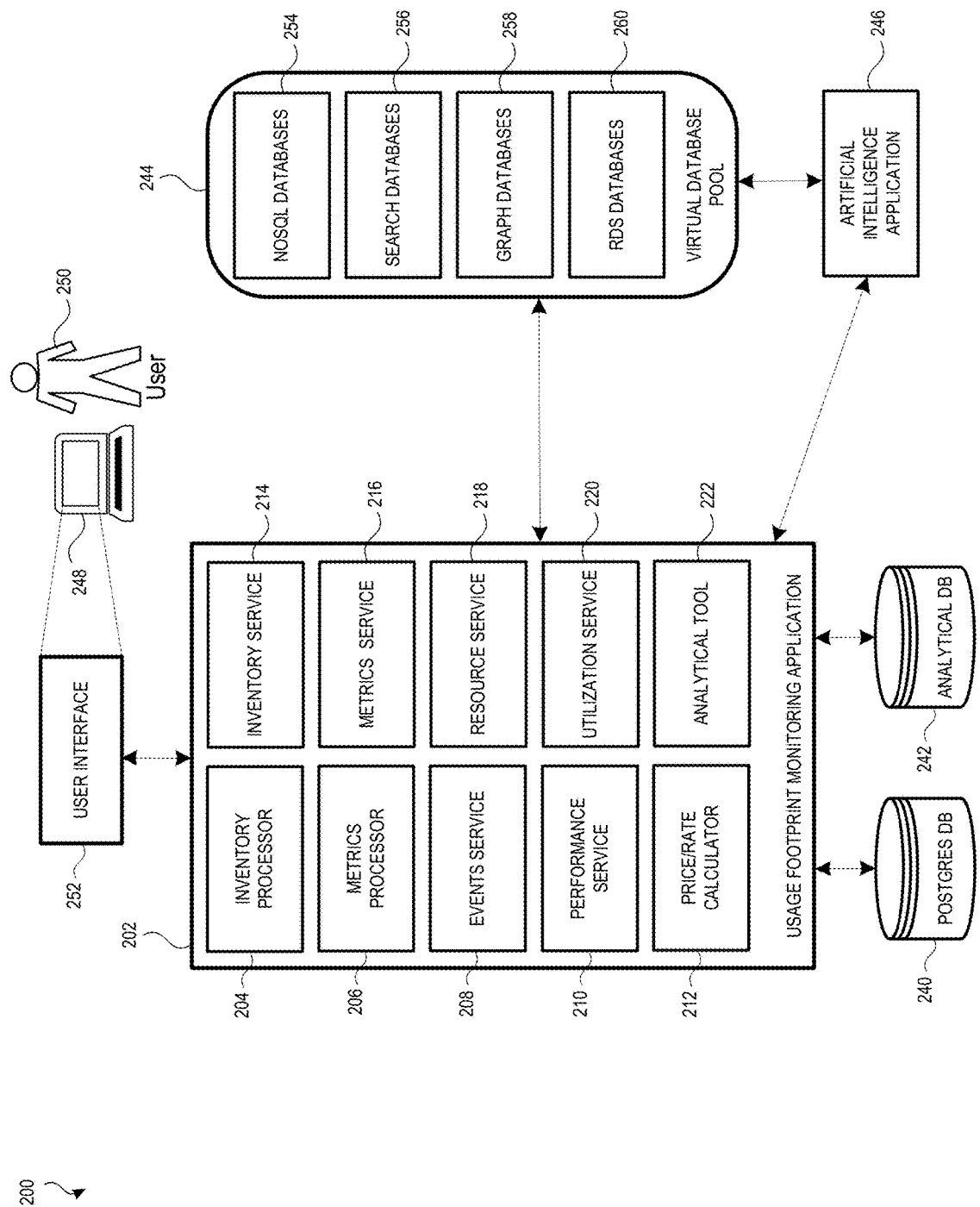
FIG. 2A illustrates further the example system of FIG. 2, wherein database performance and usage footprint monitoring and analysis platform is in communication with a virtual database pool, according to an example.

FIG. 2A further illustrates the example system of FIG. 2 for receiving and analyzing metrics and data across a plurality of heterogenous databases allocated to different groups within an enterprise, comprising a database performance and usage footprint monitoring and analysis platform and a user interface, wherein the database performance and usage footprint monitoring and analysis platform is in communication with a virtual database pool, according to an example. As will be described in more detail below, the system 200 includes a database (DB) usage footprint monitoring platform 202 which may include sub-processors, tools, services, or calculators such as an inventory processor 204, metrics processor 206, events service 208, performance service 210, price/rate calculator 212, inventory service 214, metrics service 216, resource service 218, utilization service 220, and analytical tool 222. The system 200 may also include a postgres database (DB) 240, an analytical database (DB) 242, an artificial intelligence application 246, a device 248, a user 250, and user interface 252. The system 200 may also include a virtual database pool 244, which may include various types of heterogeneous databases. In an example, virtual database pool 244 includes NoSQL databases 254, search databases 256, graph databases 258, and relational database services (RDS) 260.

In some examples, artificial intelligence application 246 may be in communication with a virtual database pool 244. In some examples, database performance and usage footprint monitoring and analysis platform 202 may be in communication with a virtual database pool 244.

In some examples, database performance and usage footprint monitoring and analysis platform 202 may determine a recommended action, which may require that all or a portion of a database of virtual database pool 244 be allocated (or unallocated) to an enterprise group. For example, a recommended action may require that a particular group needs a specified amount of storage space in NoSQL databases 254, based on past and current data usage and/or a predicted future data usage, and the type of data. The recommended action may have been determined by either analytical tool 222, artificial intelligence application 246, or a combination of analyses from both. In one aspect of this example, database performance and usage footprint monitoring and analysis platform 202 may provide the recommended action to user 250 on device 248 via user interface 252. In another aspect of this example, database performance and usage footprint monitoring and analysis platform 202 (or artificial intelligence application 246, or a combination of both) may automatically initiate the allocation of the specified amount of storage space of NoSQL databases 254 to the particular group. In some examples, after the action is automatically initiated, database performance and usage footprint monitoring and analysis platform 202 may provide a communication to user 250 on device 248 via user interface 252, notifying user 250 of the action. In some examples, the recommended action may be based, at least in part, on any or a combination of the following: past data utilization of a group, current data utilization of a group, predicted trends or datapoints for a group, type or formatting of data, function of the group, requirements or needs of the group, type of database, and how much space is available in the virtual database pool database (for example, NoSQL databases 254, search databases 256, graph databases 258, or relational database services 260) which can be allocated.

FIG. 3 illustrates an example method for receiving and analyzing metrics and data across a plurality of heterogenous databases allocated to different groups within an enterprise, according to an example. The method 300 may be performed by one or more systems of the system 100 or the system 200 shown and described with respect to FIG. 1, FIG. 2, and FIG. 2A.

Method 300 begins at step 302 with a database performance and usage footprint monitoring and analysis platform receiving data associated with a plurality of heterogeneous databases, at least a portion of one or more of the plurality of heterogeneous databases being allocated to one or more of a plurality of functional groups within an enterprise organization, each of the plurality of functional groups having a specified database requirement. In some examples, usage data may be received from one or more enterprise data sources other than the plurality of heterogenous databases, one (or several) cloud storage providers. In some examples, the usage data may be received over a time period, or multiple time periods. In some examples, the time periods may be weekly, biweekly, monthly, quarterly, yearly, consecutive, interrupted, or any other appropriate time period. In some examples, the specified database requirement may include a required amount of data storage, required format of data storage, required type of data storage, security requirements for data storage, data backup requirements, data access requirements, or other requirements. In some examples, the data may include metrics associated with the plurality of heterogeneous databases. In some examples, metrics may include usage metrics. In some examples, metrics may include performance data, data of events occurred, data of properties defined, and/or prediction data. In some examples, the data may be received as part of an automatic assessment, and in other examples, the data may be received in response to an initiated request or action. The received data may include utilization, performance, metrics, statistics, storage, cost, enterprise group allocations, or other relevant information. In some examples, the heterogeneous databases may be allocated in whole or in part to various enterprise groups. In some examples, the groups may be related to different functions or departments of an enterprise, such as (e.g. engineering, marketing, operations, or accounting). The specified database requirement may, in some examples, refer to an amount of storage of one or more types of databases that is needed by the group for data storage or other appropriate purposes. In some examples, the plurality of heterogeneous databases may store and process different types of data and provide different metrics (such as different performance datapoints, for example), may be supplied from different vendors, and in some examples, the heterogeneous database cannot communicate with each other. In some examples, various databases may be virtual (e.g. cloud-based); in other examples, they may be network or drive-based.

In some examples, at step 304 the database performance and usage footprint monitoring and analysis platform may analyze the received data, including calculating usage metrics associated with the plurality of heterogeneous databases. In some examples, analyzing the data may include associating the data with usage metrics, calculating statistics, generating comparisons, associating the data with groups, associating the data with a specified time period, or other appropriate analyses. In some examples, all or part of the analysis may be done by an artificial intelligence application.

In some examples, usage metrics, other received data, calculated statistics, generated comparisons, and/or other relevant data relating to a database are associated with a capture time of the usage data. In some examples, usage metrics and data may be correlated between databases, trends may be forecasted from the data, database performance/behavior may be analyzed, and recommended actions may be generated.

In some examples, at step 306, the database performance and usage footprint monitoring and analysis platform may generate a user interface that displays a comparison of the usage metrics across a plurality of time periods, wherein at least a portion of the metrics are associated with the one or more of the plurality of functional groups. In some examples, data and usage metrics (for example, statistics, rankings, trends, percentages, etc.) are displayed via the user interface on a device, such as a computer, tablet, or smartphone. The user interface may be a web application in some examples. In some examples, the user interface may provide a user with graphs, charts, tables, diagrams, comparisons, or other appropriate means of viewing the displayed metrics and data. In some examples, the user interface may be customizable by the user. In some examples, the user may interact with the user interface, such as modify graphs or tables, sort or filter data, request calculation of a new metric, request a new assessment, or initiate an action.

Figure 4:
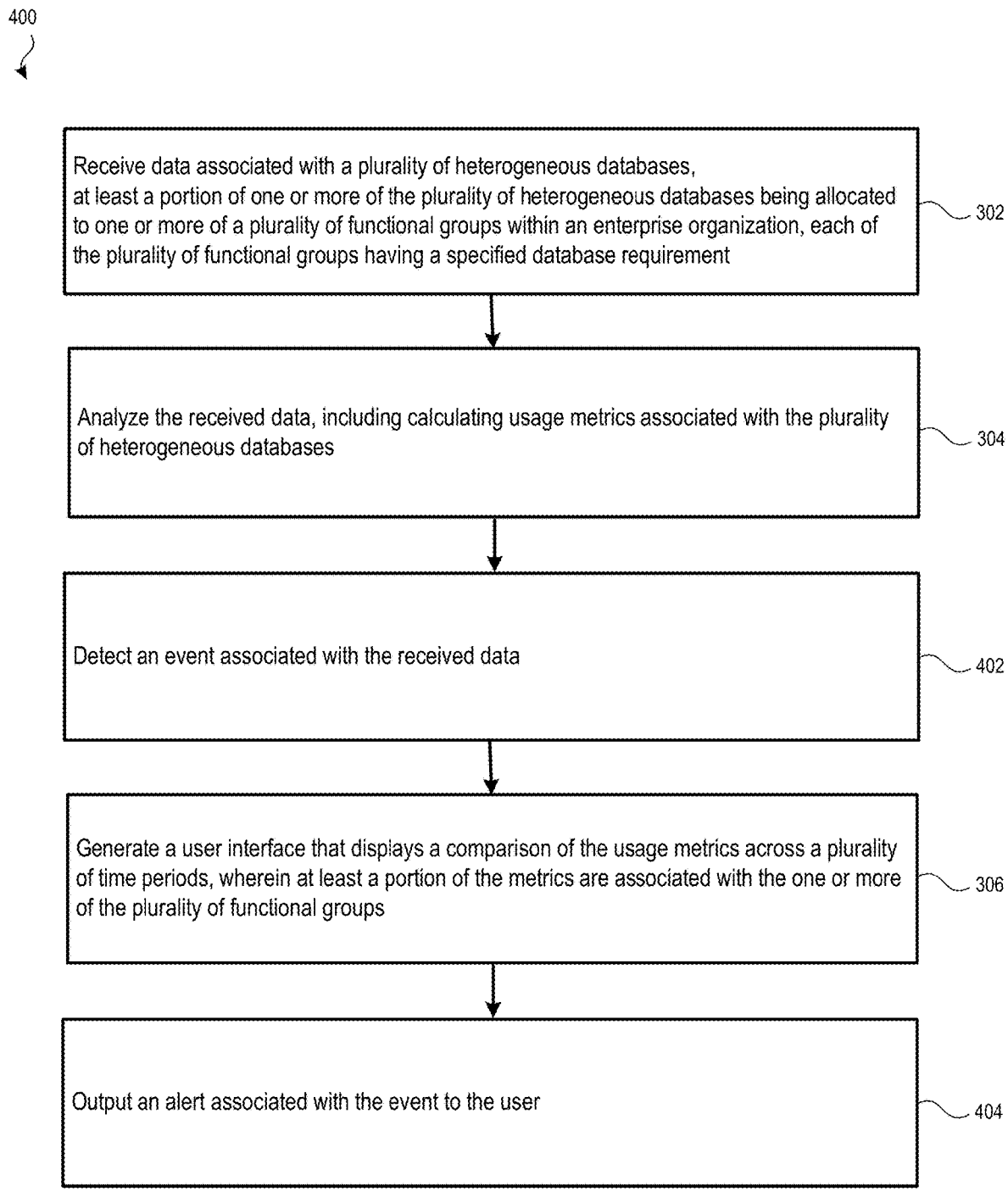
FIG. 4 further illustrates the example method of FIG. 3, wherein an alert associated with a detected event is provided to a user, according to an example.

FIG. 4 further illustrates the example method of FIG. 3, wherein an alert associated with a detected event is provided to a user, according to an example. In an example, the method 400 may be performed by one or more systems of the system 100 or the system 200 shown and described with respect to FIG. 1, FIG. 2, and FIG. 2A.

In some examples, at step 402, the database usage footprint monitoring platform may detect an event associated with the received data. In some examples, the identified event or alert event may be generated in response to detection of a performance or cost condition identified based on a comparison of usage metrics across time periods, across a plurality of heterogenous databases, or across various functional groups. In some examples, the event may be associated with an alert or error related to one or more of the heterogeneous databases (for example, an error message that a database cannot connect to a network). In some examples, the event may be associated with the received data (for example, received utilization data shows that a group has utilized its entire allocation of a specified database). In some examples, the event may be associated with a trend or predicted value for data (for example, a predicted value shows that a group will require additional of a specific type of storage). In some examples, the event may be associated with performance data and/or metrics of one or more of the heterogeneous databases (for example, a performance metric shows that a database is operating slowly).

In some examples, the event (and associated alert as described below at step 404) may be associated with a disk utilization of a resource. In some examples, the event (and associated alert as described below at step 404) may be associated with a deviation or anomaly oof a performance and/or usage metric. In some examples, a deviation may be defined as a type of anomaly. In some examples, a deviation event may occur when a metric (such as a performance or usage metric) falls below or above a predetermined threshold. In some examples, the predetermined threshold may be fixed at an acceptable level. In some examples, the predetermined threshold may be adaptive, and may change according to one or more factors, including behavior of the resource. In some examples, an anomaly may be a datapoint or data trend in resource behavior which is uncharacteristic or problematic for the resource. In some examples, an anomaly may relate to a single metric or to multiple metrics. In some examples, the system may perform a combinational analysis, where two (or more, in some examples) metrics (which may be correlated with use and impact, for example) are evaluated at the same time, and if both metrics show the anomaly in behavior, the system may generate an anomaly alert (such as described below at step 404).

In some examples, at step 404, the database performance and usage footprint monitoring and analysis platform may output an alert associated with the event/alert event to the user. In an example, an alert may be generated which is intended to inform a user about the event. The alert may include a description of the event, the type of data it arose from, the group associated with the event (if any), the database associated with the event, the time at which the event was recognized or detected, or any other relevant factors. In some examples, along with or instead of an alert, a recommendation may be generated which is based on the event/alert event. In some examples, the alert may be provided to the user via the user interface. In some examples, the alert may be provided to the user at the time it is detected or recognized; in other examples, the alert may be provided to the user at an alternate time. In some examples, the alert may be output via the user interface generated in step 306. In other examples, the alert may be output as a separate display or other method of sending a message, such as an email, phone call, or text message.

FIG. 5 further illustrates the example method of FIG. 3, wherein a predicted value associated with received data is calculated, according to an example. In an example, the method 500 may be performed by one or more systems of the system 100 or the system 200 shown and described with respect to FIG. 1, FIG. 2, and FIG. 2A.

In some examples, at step 502, the database performance and usage footprint monitoring and analysis platform may calculate a predicted value associated with the received data or the usage metrics. In some examples, the predicted value may be associated with the utilization of a particular database by a particular group. In some examples, the predicted value may be associated with the performance of a database. In some examples, the predicted value may be a predicted cost or cost savings associated with a particular database. In some examples, the predicted value may be associated with a recognized trend. In some examples, the predicted value may be associated with technology growth analysis.

In some examples, at step 504, the database performance and usage footprint monitoring and analysis platform may generate a user interface to display the usage metrics, the predicted value, and/or a comparison of the usage metrics across a plurality of time periods to a user, at least a portion of the metrics being associated with the one or more of the plurality of groups. In some examples, data, comparisons, predicted value, and metrics (for example, statistics, rankings, trends, percentages, etc.) are displayed via the user interface on a device, such as a computer, tablet, or smartphone. The user interface, may be a web application in some examples. In some examples, the user interface may provide a user with graphs, charts, tables, diagrams, comparisons, or other appropriate means of viewing the displayed metrics and data. In some examples, the user interface may be customizable by the user. In some examples, the user may interact with the user interface, such as modify graphs or tables, sort or filter data, request calculation of a new metric, request a new assessment, or initiate an action.

Figure 6:
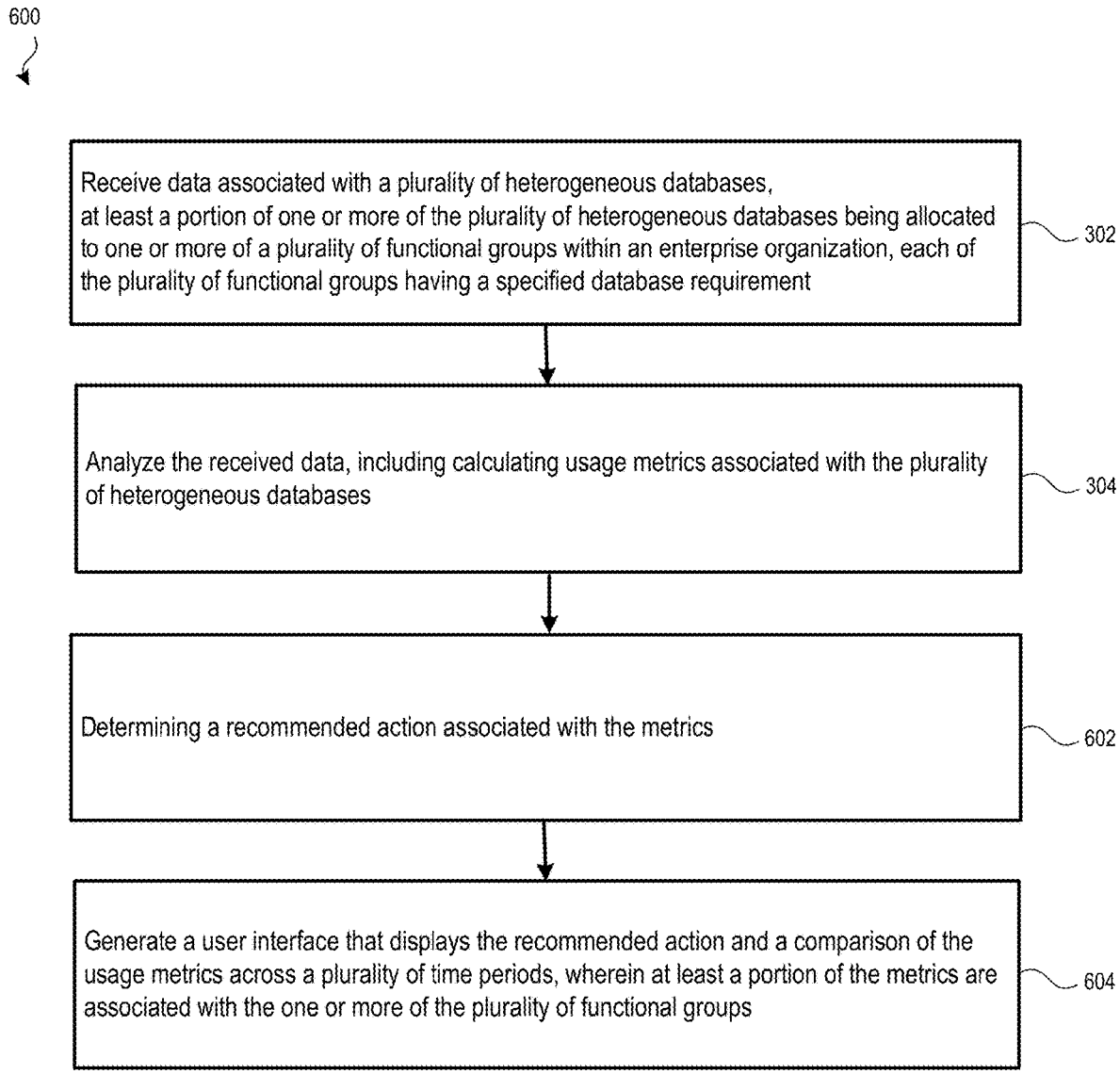
FIG. 6 further illustrates the example method of FIG. 3, wherein a recommended action associated with the metrics is displayed to a user, according to an example.

FIG. 6 further illustrates the example method of FIG. 3, wherein a recommended action associated with the metrics is displayed to a user, according to an example. In an example, the method 600 may be performed by one or more systems of the system 100 or the system 200 shown and described with respect to FIG. 1, FIG. 2, and FIG. 2A.

In some examples, at step 602, the database performance and usage footprint monitoring and analysis platform may automatically determine a recommended action associated with the metrics. In some examples, a recommended action (e.g. an automated recommendation) may be a result of a root cause analysis of an event. In some examples, a recommended action may be based, at least in part, on one or more of the following: current received data and/or metrics, a predicted/forecasted value, a detected event (alert event), a determined trend, or a recognized pattern. In some examples, a recommended action may include moving data from one database to another, allocating more or less of a database to an enterprise group, allocating or un-allocating a database to an enterprise group, modifying software or hardware, decommissioning or scaling (upscaling or downscaling) a database on the enterprise or group level, perform maintenance on systems, among others. In some examples, all or part of generating a recommended action may be done by an artificial intelligence application.

In some examples, at step 602, the database performance and usage footprint monitoring and analysis platform may generate a user interface to display the usage metrics, the recommended action, and/or a comparison of the usage metrics across a plurality of time periods to a user, at least a portion of the metrics being associated with the one or more of the plurality of groups. In some examples, data, comparisons, predicted value, and metrics (for example, statistics, rankings, trends, percentages, etc.) are displayed via the user interface on a device, such as a computer, tablet, or smartphone. The user interface may be a web application in some examples. In some examples, the user interface may provide a user with graphs, charts, tables, diagrams, comparisons, or other appropriate means of viewing the displayed metrics and data. In some examples, the user interface may be customizable by the user. In some examples, the user may interact with the user interface, such as modify graphs or tables, sort or filter data, request calculation of a new metric, request a new assessment, or initiate an action.

FIG. 7 further illustrates the example method of FIG. 3C, wherein the recommended action is automatically carried out, according to an example. In an example, the method 700 may be performed by one or more systems of the system 100 or the system 200 shown and described with respect to FIG. 1, FIG. 2, and FIG. 2A.

In some examples, at step 702, the database performance and usage footprint monitoring and analysis platform may automatically initiate the carrying out of the recommended action. In some examples, all or part of carrying out the recommended action may be done by an artificial intelligence application. In some examples, a report or alert regarding a recommended action which was automatically carried out may be displayed to the user via the user interface. In an example, the database performance and usage footprint monitoring and analysis platform may generate a recommended action to decrease or increase the amount of storage space of a database which is allocated to a particular group. In that example, the database performance and usage footprint monitoring and analysis platform may automatically decrease or increase the amount of storage space on the database that is allocated to the particular group according to the recommended action. In that example, the database usage footprint monitoring platform may automatically decrease or increase the amount of storage space on the database that is allocated to the particular group according to the recommended action.

Figure 8:
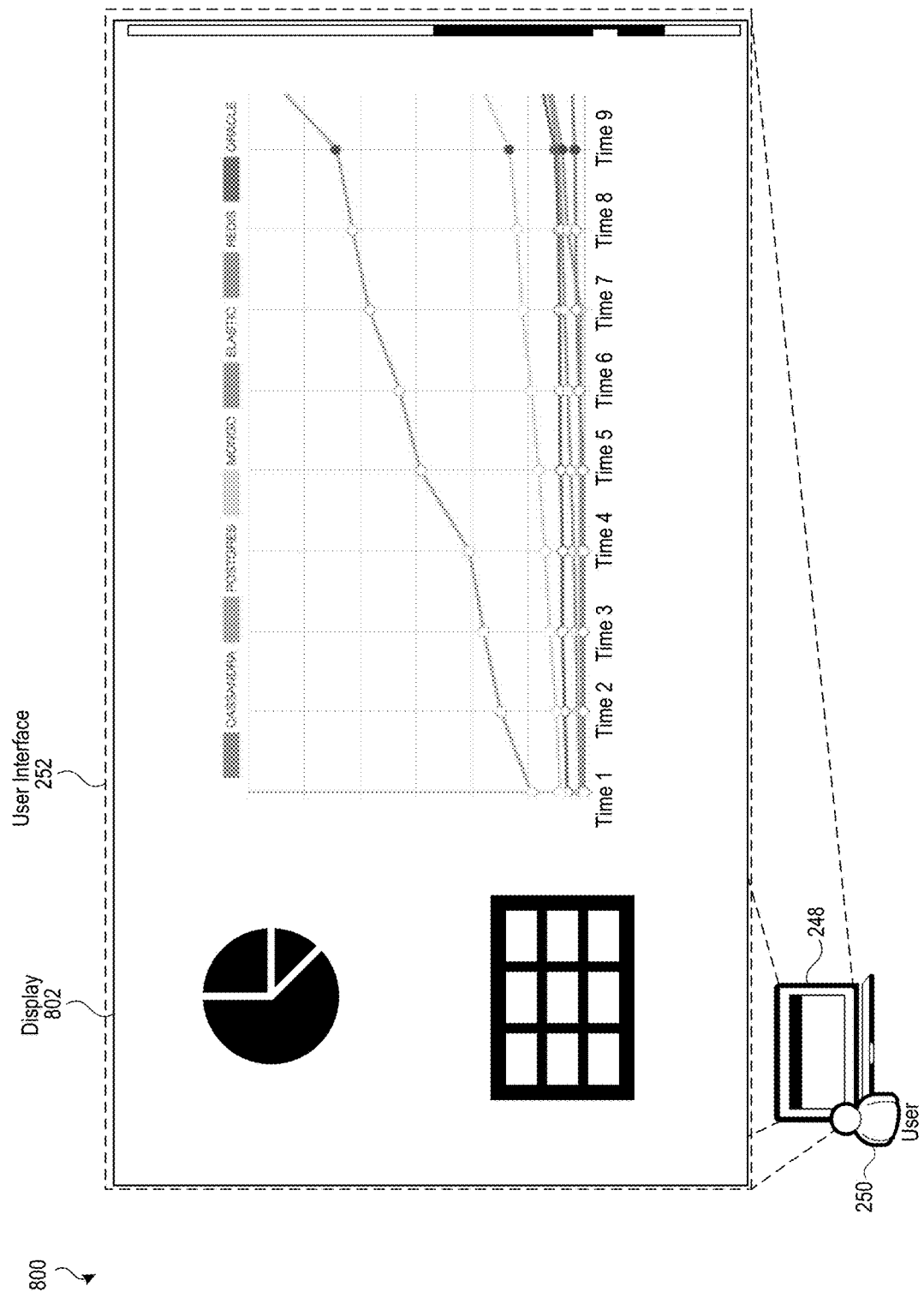
FIG. 8 illustrates an example display on a user interface, showing database metrics in the form of graphs, charts, and tables, according to an example.

FIG. 8 illustrates an example display on a user interface, showing database metrics in the form of graphs, charts, and tables, according to an example. In some examples, data and usage metrics (for example, statistics, rankings, trends, percentages, etc.) are displayed via user interface 252 on device 248, which may be, in some examples, a computer, laptop, tablet, or smartphone. In some examples, user interface 248 may be a web application or another application type. In some examples, user interface 248 may provide data and information as display 802, which may provide a user with graphs, charts, tables, diagrams, comparisons, or other appropriate means of viewing the displayed metrics and data. In some examples, user interface 248 may be customizable by user 250. In some examples, user 250 may interact with the user interface, such as modify graphs or tables, sort or filter data, request calculation of a new metric, request a new assessment, or initiate an action. In some examples, display 802 may include a chart which depicts data trends for different heterogeneous databases of an organization over time. The trends may include past data received for a time period, and may also include predicted data for future time periods. Data presented over a time period may be in hourly, daily, weekly, monthly, quarterly, annually increments, or any other appropriate time increment. Display 802 may allow user 250 to compare data, metrics, and analyses for different functional groups or time periods; to see how data, metrics, and analyses change over time; to view predicted values and trends so that efficient business decisions may be made; and to do all of this for data, metrics, and analyses that may be for heterogeneous databases. In some examples, this increased accessibility to data, metrics, and analyses may allow user 250 to make enterprise decisions with increased reliability and operational efficiency.

Figure 9:
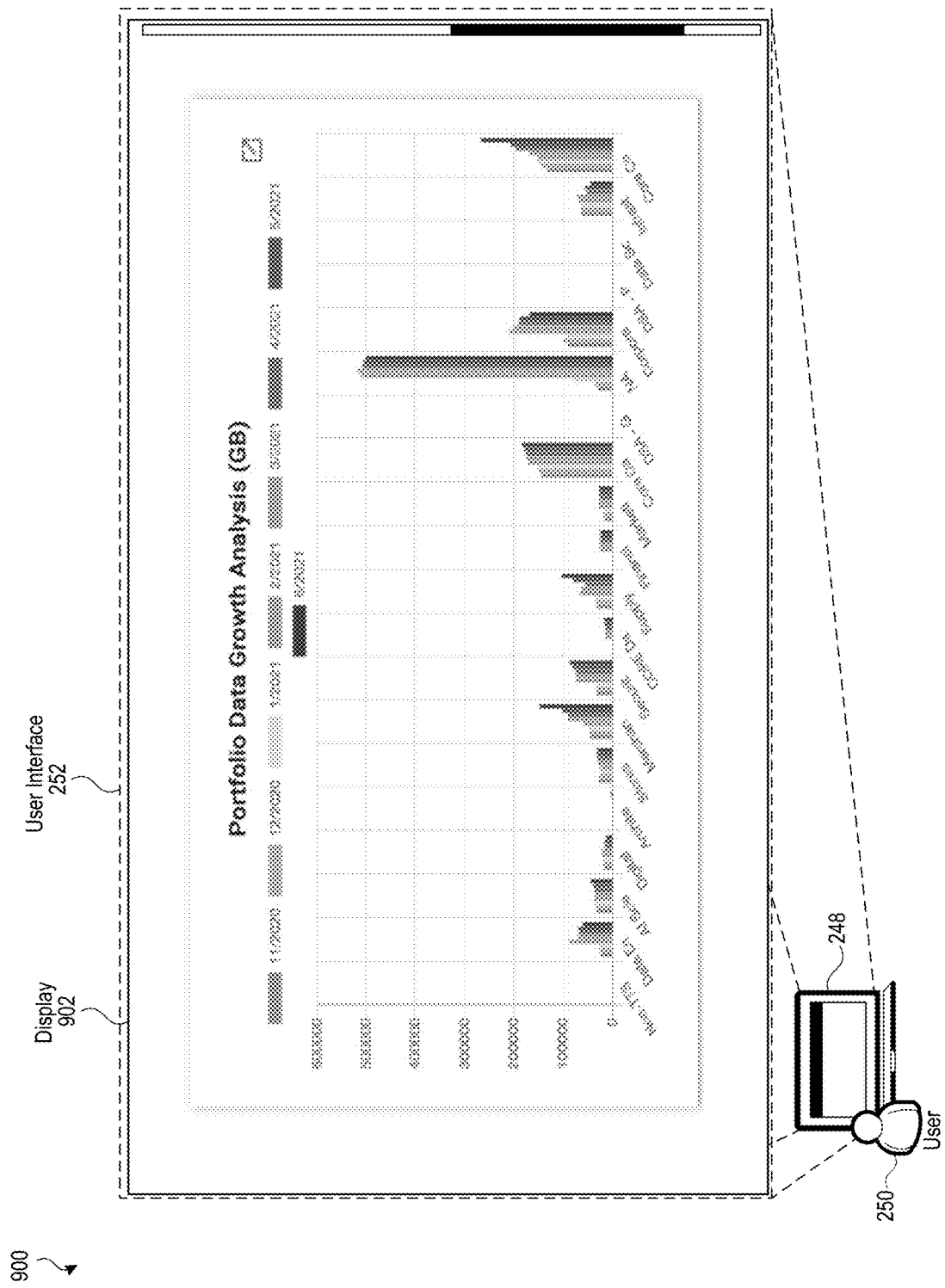
FIG. 9 illustrates an example display on a user interface, showing database data on a per-group basis, according to an example.

FIG. 9 illustrates an example display on a user interface, showing database data on a per-group basis, according to an example. In some examples, data and usage metrics (for example, database storage, database usage, frequency of usage, number of functional group personnel, etc.) are displayed via user interface 252 on device 248. In some examples, user interface 248 may provide data and information as display 902, which may provide a user with a graph depicting data (and, in some examples, changes in that data) associated with different functional groups over different time periods. In some examples, user 250 may interact with the user interface, such as modify graphs or tables, sort or filter data, request calculation of a new metric, request a new assessment, or initiate an action. In some examples, display 902 may include past data received for time periods, and may also include predicted data for future time periods. Time periods may be in hourly, daily, weekly, monthly, quarterly, annually increments, or any other appropriate time increment. Time periods may be consecutive or intermittent (i.e. may have periods of time in between for which there is no data displayed for myriad reasons). Display 902 may allow user 250 to compare data and usage metrics between functional groups, and over time for one or multiple functional groups. In some examples, this may allow user 250 to troubleshoot problems, identify potential future problems, or adjust future database usage.

Figure 10:
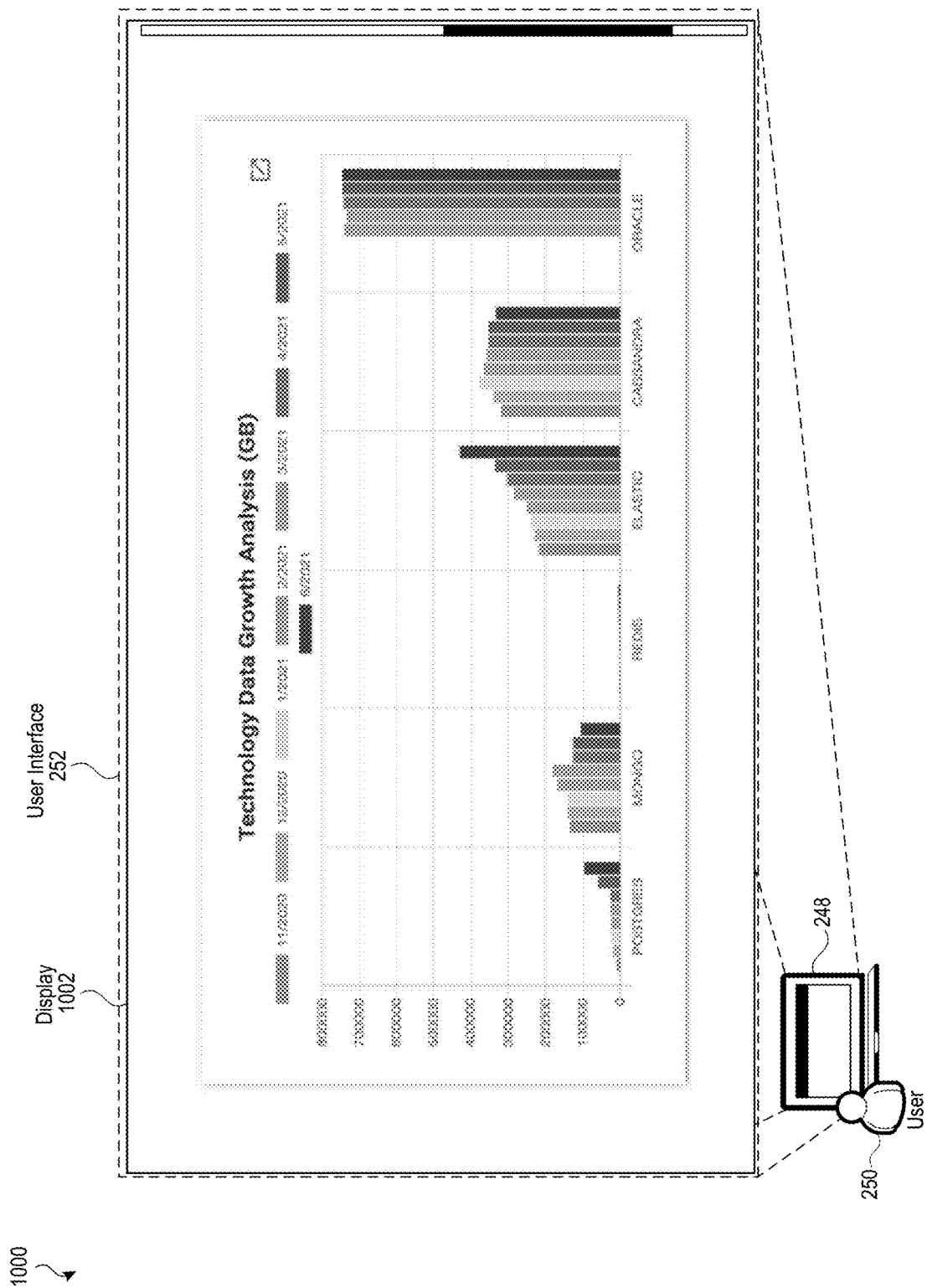
FIG. 10 illustrates an example display on a user interface, showing database metrics over time, according to an example.

FIG. 10 illustrates an example display on a user interface, showing database metrics over time, according to an example. In some examples, data and usage metrics (for example, database storage, database usage, frequency of usage, etc.) are displayed via user interface 252 on device 248. In some examples, user interface 248 may provide data and information as display 1002, which may provide a user with a graph depicting data (and, in some examples, changes in that data) associated with different heterogeneous databases over different time periods. In some examples, user 250 may interact with the user interface, such as modify graphs or tables, sort or filter data, request calculation of a new metric, request a new assessment, or initiate an action. In some examples, display 1002 may include past data received for time periods, and may also include predicted data for future time periods. Time periods may be in hourly, daily, weekly, monthly, quarterly, annually increments, or any other appropriate time increment. Time periods may be consecutive or intermittent (i.e. may have periods of time in between for which there is no data displayed for myriad reasons). Display 1002 may allow user 250 to compare data and usage metrics between databases, and over time for one or multiple databases. In some examples, this may allow user 250 to troubleshoot problems, identify potential future problems, or adjust future database usage. In some examples, the databases are heterogeneous databases.

Figure 11:
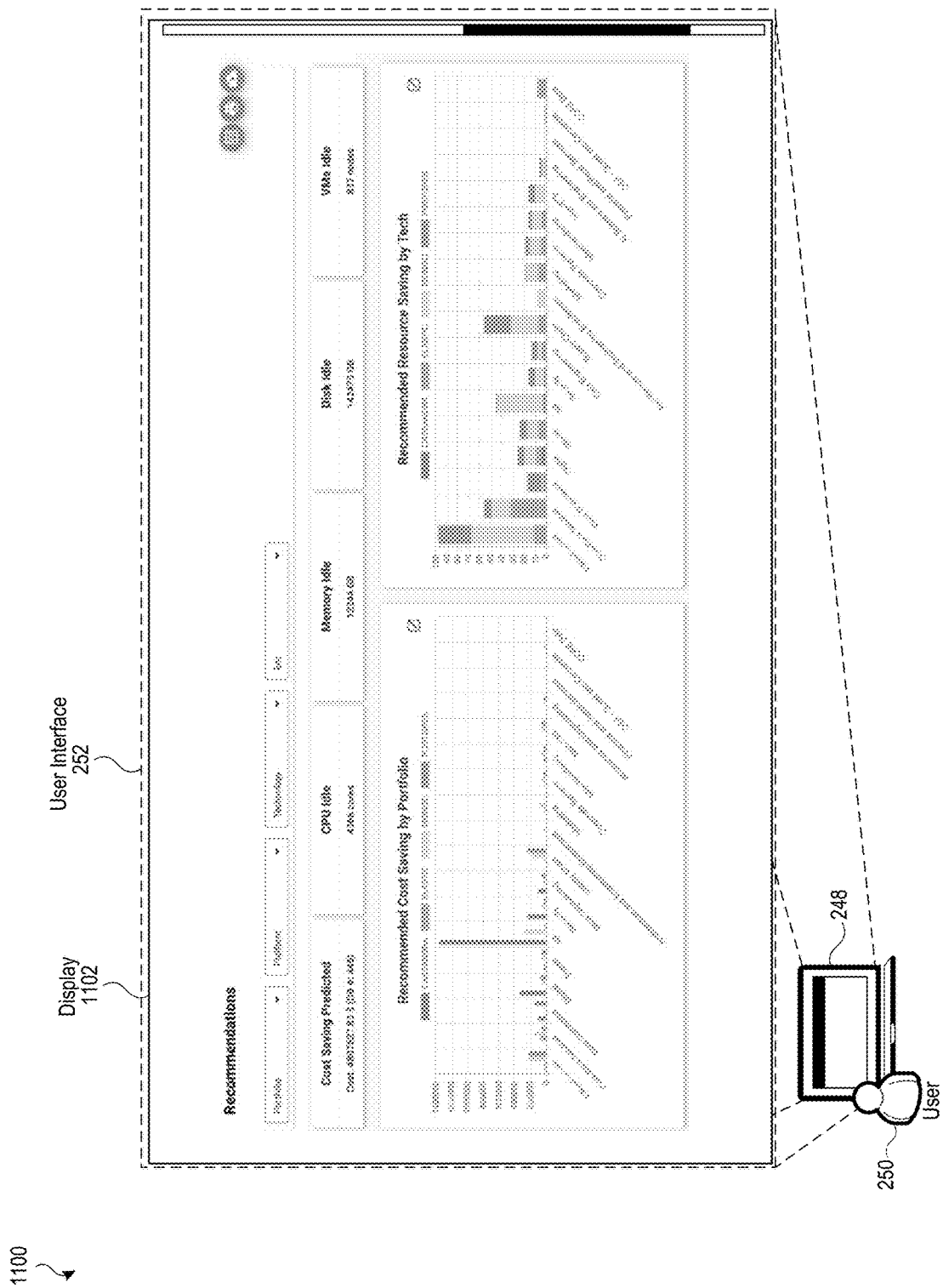
FIG. 11 illustrates an example display on a user interface, showing database metrics, recommended cost savings, predicted cost savings, and recommended resource savings, according to an example.

FIG. 11 illustrates an example display on a user interface, showing database metrics, recommended cost savings, predicted cost savings, and recommended resource savings, according to an example. In some examples, data and usage metrics (for example, costs, resource usage, usage data, usage metrics, predicted values (for example, predicted cost savings or resource savings), etc.) are displayed via user interface 252 on device 248. In some examples, user interface 248 may provide data and information as display 1102, which may provide user 250 with a graph depicting recommended cost savings for one or more functional groups. In some examples, recommended cost savings may be provided for one or more databases. In some examples, the recommended cost savings may be associated with one or more recommended actions. In some examples, display 1102 may provide user 250 with a graph depicting recommended resource savings for one or more functional groups. In some examples, recommended resource savings may be provided for one or more databases. In some examples, the recommended resource savings may be associated with one or more recommended actions. In some examples, display 1102 may provide use 250 with a predicted cost savings number, which may be associated with one or more recommended actions, in some examples. In some examples, display 1102 may provide additional data or metrics associated with one or more databases, such as CPU idle time, memory idle time, disk idle time, or VMs idle time. In some examples, the data and metrics provided by display 1102 may be associated with a particular time period. In some examples, user 250 may interact with the user interface, such as modify graphs or tables, sort or filter data, request calculation of a new metric, request a new assessment, or initiate an action. In some examples, user 250 may interact with the user interface, such as modify graphs or tables, sort or filter data, request calculation of a new metric, request a new assessment, or initiate an action. For example, display 1102 may include dropdown menus so that user 250 may view data associated with a particular enterprise portfolio, platform, technology, or environment; by interacting with the dropdown menus, user 250 may customize and change the contents of display 1102. Display 1102 may allow user 250 to make future business decisions and see the impact that those decisions (in some examples, decisions of whether to implement one or more recommended actions) may have on cost and/or enterprise resources. In some examples, this increased accessibility to data, metrics, and predicted values may allow user 250 to make more efficient and cost-effective decisions regarding the use of enterprise resources.

Figure 12:
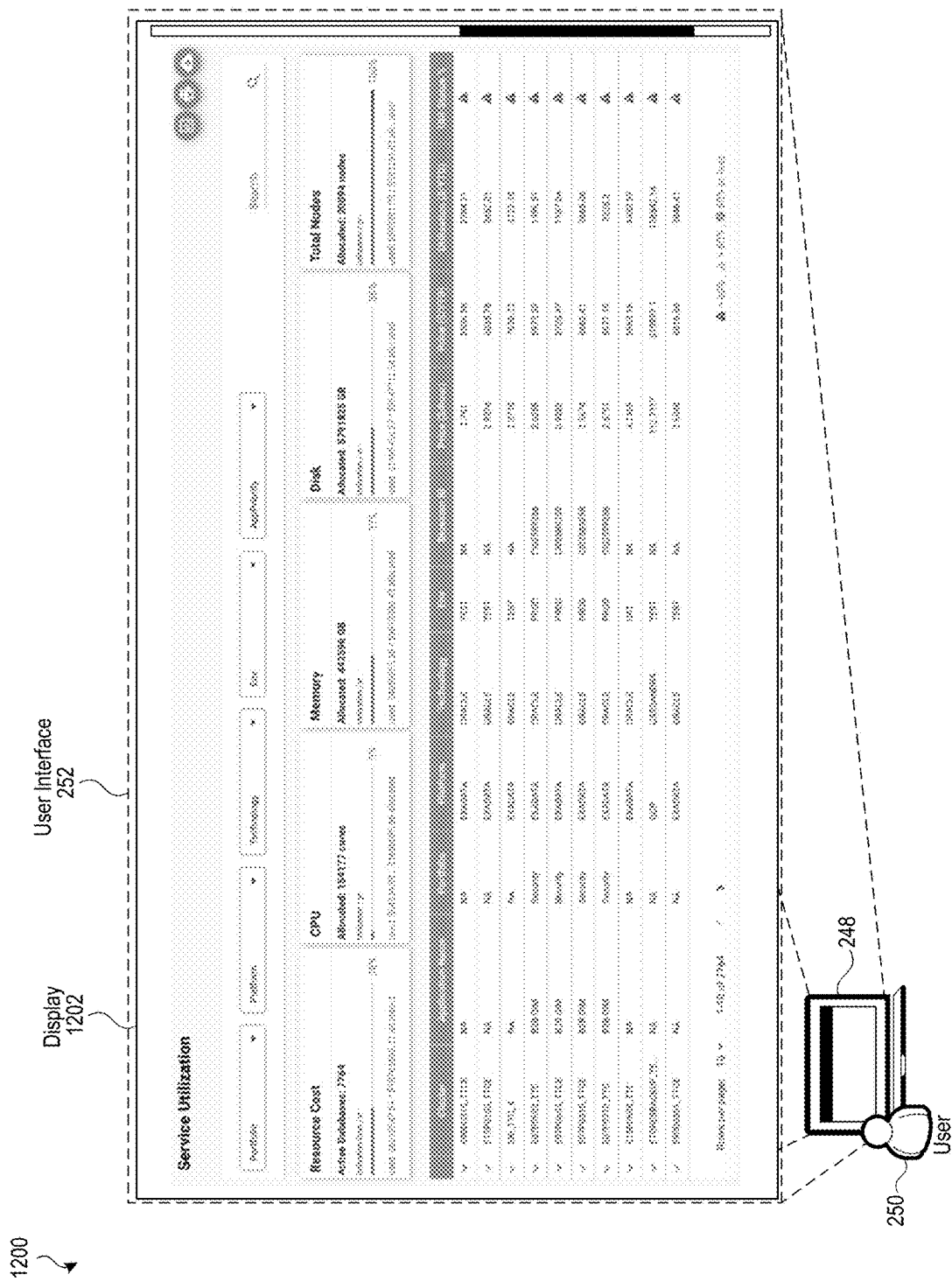
FIG. 12 illustrates an example display on a user interface, showing database metrics and cost for a particular resource, according to an example.

FIG. 12 illustrates an example display on a user interface, showing database metrics and cost for a particular resource, according to an example. In some examples, data and usage metrics are displayed via user interface 252 on device 248. In some examples, user interface 248 may provide data and information as display 1202, which may provide a user with a graph depicting data and metrics associated with a particular database or selection of databases (in some examples, over a particular time period). In some examples, user 250 may interact with the user interface, such as modify graphs or tables, sort or filter data, request calculation of a new metric, request a new assessment, or initiate an action. For example, display 1202 may include dropdown menus so that user 250 may view data associated with a particular enterprise portfolio, platform, technology, environment, or priority; by interacting with the dropdown menus, user 250 may customize and change the contents of display 1202. In some examples, display 1202 may include resource cost, number of active databases, CPU data, memory data, disk data, total node allocation data, application names, portfolios associated with a cluster, database type/technology, whether the database is in a testing environment, price over a particular time period, utilization (in some examples, as a cost), status, or other relevant data. Display 1202 may provide user 250 with increased accessibility to view and compare focused data and metrics associated with a particular database or selected group of databases, which may be heterogeneous databases.

Figure 13:
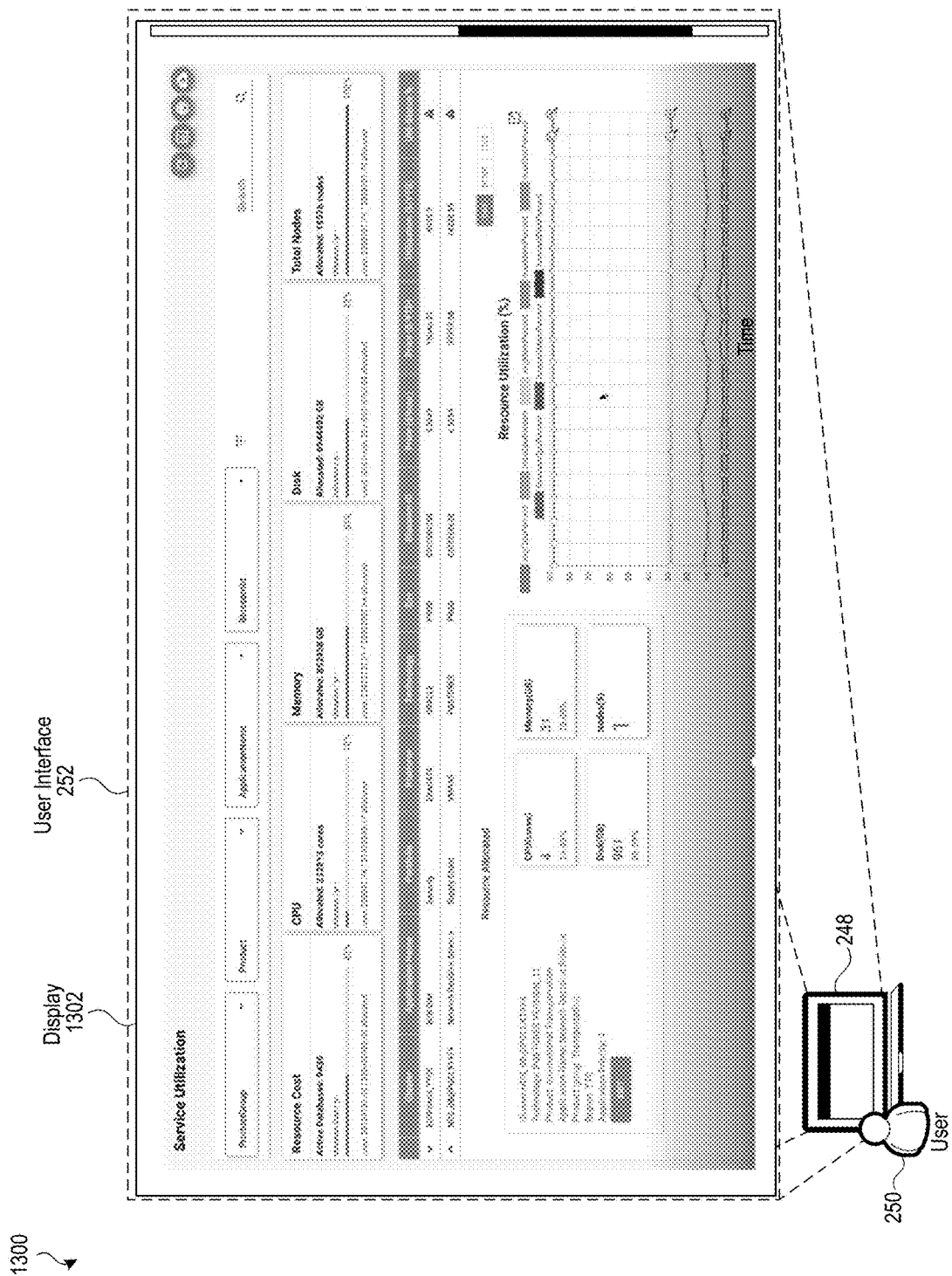
FIG. 13 illustrates an example display on a user interface, showing database over time and cost for a particular resource, according to an example.

FIG. 13 illustrates an example display on a user interface, showing database over time and cost for a particular resource, according to an example. In some examples, data and usage metrics are displayed via user interface 252 on device 248. In some examples, user interface 248 may provide data and information as display 1302, which may provide a user with a graph depicting data and metrics associated with a particular database or selection of databases (in some examples, over a particular time period). In some examples, user 250 may interact with the user interface, such as modify graphs or tables, sort or filter data, request calculation of a new metric, request a new assessment, or initiate an action. For example, display 1302 may include dropdown menus so that user 250 may view data associated with a particular product, product group or category, application, or other identifying factor; by interacting with the dropdown menus, user 250 may customize and change the contents of display 1302. In some examples, display 1302 may include resource cost, CPU data, memory data, disk data, total node allocation data, application names, portfolios associated with a cluster, database type/technology, whether the database is in a testing or production environment, price over a particular time period, utilization (in some examples, as a cost), status, or other relevant data. Display 1302 may allow user 250 to view and compare focused data and metrics associated with a particular database or selected group of databases, which may be heterogeneous databases.

In some examples, user 250 may select a particular resource/database, and display 1302 may provide specific resource allocation data associated with the selected resource. In some examples, display 1302 may provide metrics such as resource utilization as a chart (for example, as a percentage of usage out of 100% usage over a time period). The chart may include data relating to different performance and utilization metrics for the selected resource, including average values, maximum values, minimum values, and/or predicted values of CPU percent usage, Memory percent usage, and/or disk percent usage. In some examples, data and outputs presented in display 1302 may be associated with an alert such as a disk utilization alert. In some examples, information presented in display 1302 may allow user 250 to determine when to proactively (or reactively) scale up capacity or utilization of a resource, scale down capacity or utilization of a resource, or decommission a resource.

Figure 14:
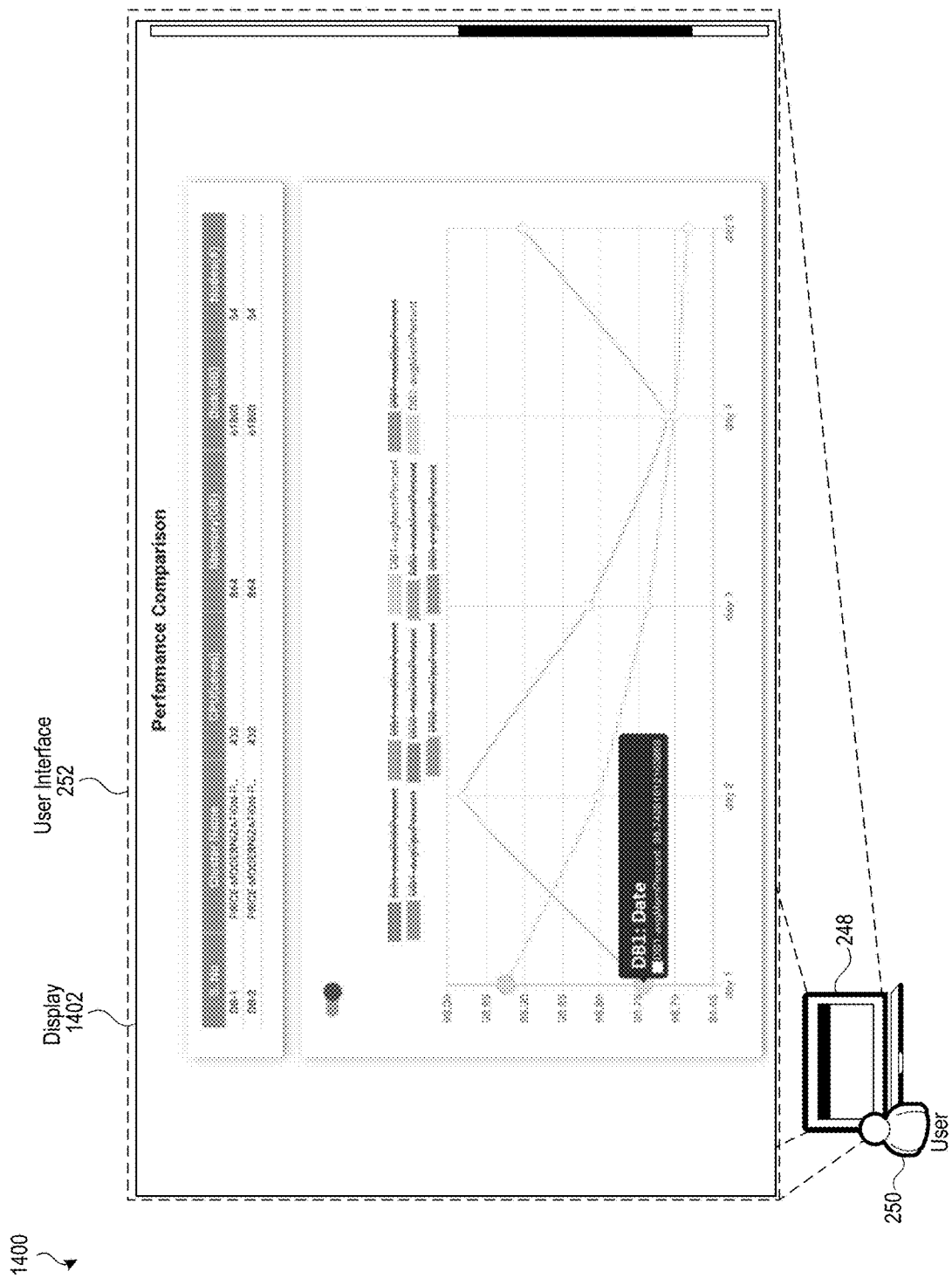
FIG. 14 illustrates an example display on a user interface, showing a resource performance comparison over time, according to an example.

FIG. 14 illustrates an example display on a user interface, showing a resource performance comparison over time, according to an example. In some examples, data and usage metrics are displayed via user interface 252 on device 248. In some examples, user interface 248 may provide data and information as display 1402, which may provide a user with a performance comparison feature. Display 1402 may include an interactive component whereby user 250 may select particular resources (for example, databases or clusters) to compare. Display 1402 may include a table showing relevant data and metrics (for example, name, CPU, memory, disk, nodes, or other relevant data) associated with the chosen resources. Display 1402 may provide a graph depicting data and/or metrics associated with the chosen resources over time (and, in some examples, changes in that data) associated with different heterogeneous databases over different time periods. In some examples, user 250 may interact with the table, thereby toggling some data on or off, so that only data from the selected resources is displayed, or so that only particular types of data or metrics associated with the selected resources are displayed. Display 1402 may allow user 250 to compare data and usage metrics between selected resources (including heterogeneous databases) over a time period, without having to gather large amounts of data from multiple sources and manually simplify and sort the data. In some examples, this may allow user 250 to efficiently perform comparisons and root cause analysis to solve problems or identify future problems or opportunities.

Figure 15:
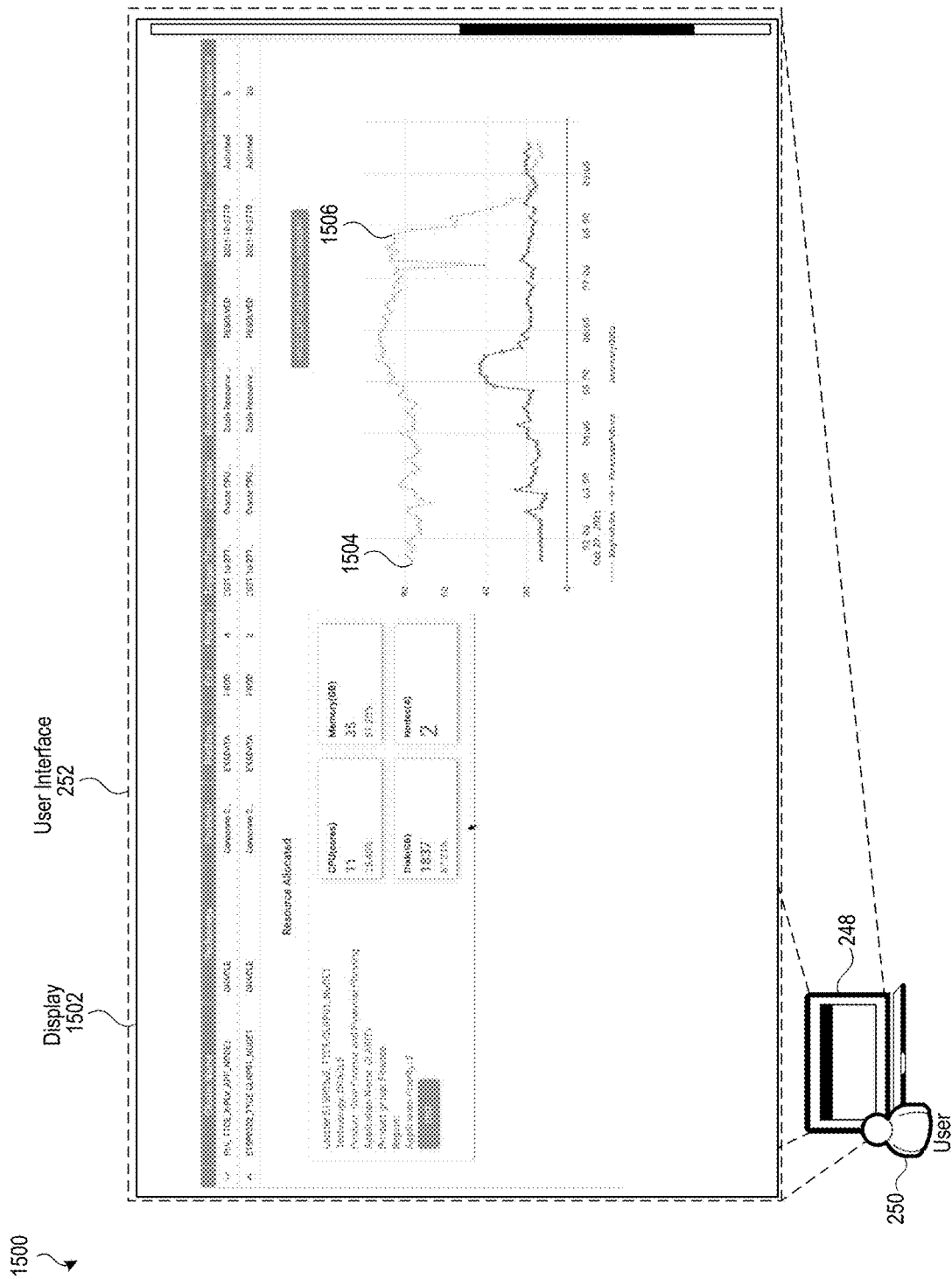
FIG. 15 illustrates an example display on a user interface, showing a deviation in database metrics, according to an example.

FIG. 15 illustrates an example display on a user interface, showing a deviation in database metrics, according to an example. In some examples, data and usage and/or performance metrics are displayed via user interface 252 on device 248. In some examples, user interface 248 may provide data and information as display 1502, which may provide a user with performance data for a resource or cluster of resources (in some examples, as a table), which may include metrics such as technology name, portfolio, whether the database is in a testing or production environment, priority, deviation trigger time, conditions, status of the deviation (for example, whether the deviation has been resolved or still persists), time of resolution, action taken, and/or an incident number. In some examples, display 1502 may also provide a recommendation for an action to address the deviation. Display 1502 may include an interactive component whereby user 250 may select particular resources (for example, databases or clusters) to compare or evaluate.

In some examples, user 250 may select a particular resource/database or a specific deviation, and display 1502 may provide specific data associated with the selected resource and/or deviation. In some examples, display 1502 may include a graph depicting key performance metrics and/or forecast metrics associated with the deviation (which may be displayed over a time period). From the data presented regarding the deviation, user 250 may be able to identify a deviation starting point 1504 of a deviation (or anomaly) and a deviation resolution point 1506. In some examples, data and recommendations presented in display 1502 may be associated with a deviation alert. This may allow user 250 detect a degraded state of a resource earlier than would otherwise be possible, which may lead to avoidance or shortening of resource downtime.

Figure 16:
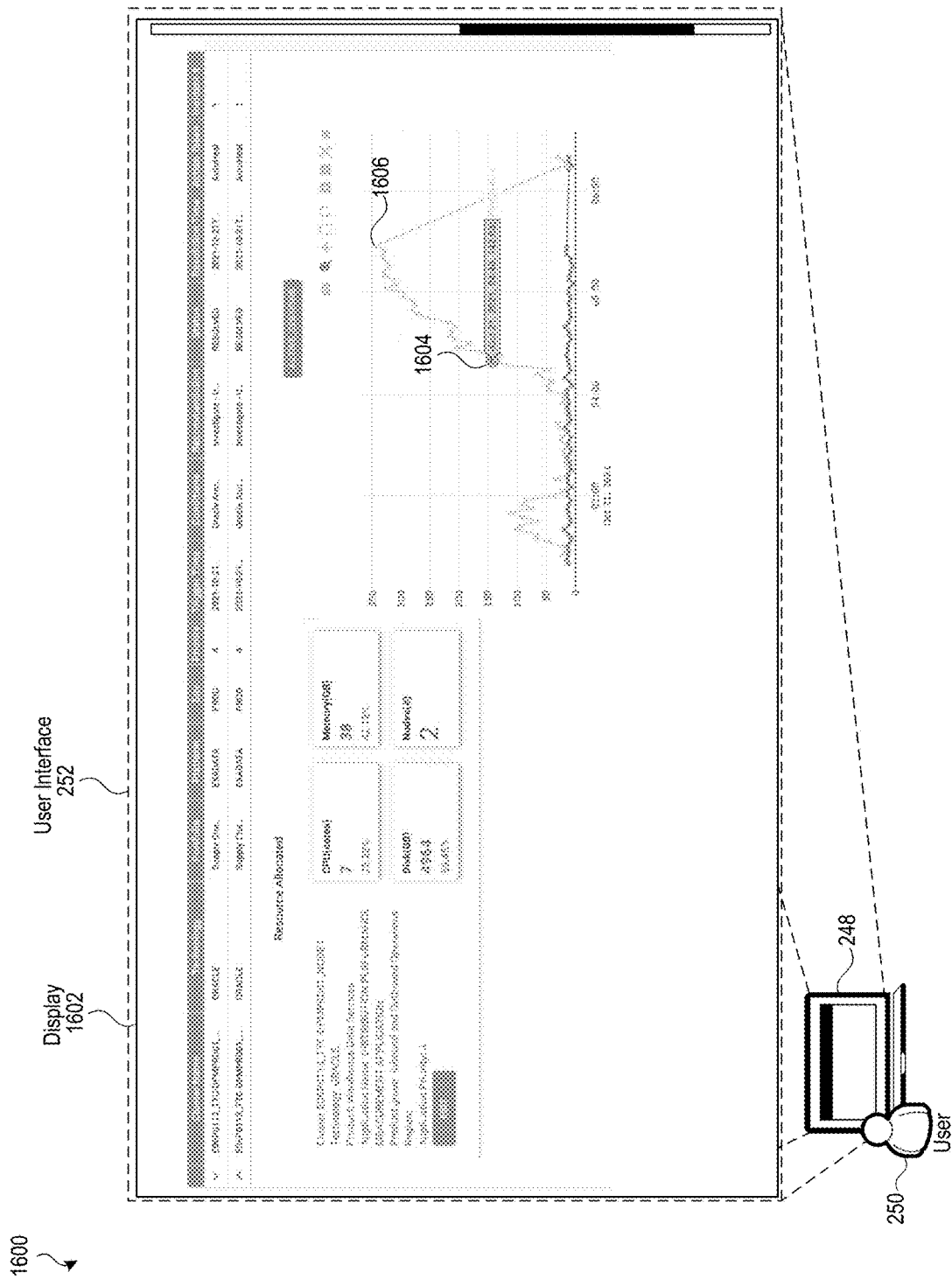
FIG. 16 illustrates an example display on a user interface, showing a performance anomaly in database metrics, according to an example.

FIG. 16 illustrates an example display on a user interface, showing a performance anomaly in database metrics, according to an example. In some examples, data and usage and/or performance metrics are displayed via user interface 252 on device 248. In some examples, user interface 248 may provide data and information as display 1602, which may provide a user with performance data for a resource or cluster of resources (in some examples, as a table), which may include metrics such as technology name, portfolio, platform type, whether the database is in a testing or production environment, priority, anomaly trigger time, conditions, status of the anomaly (for example, whether the anomaly has been resolved or still persists), time of resolution, action taken, and/or an incident number. In some examples, display 1602 may also provide a recommendation for an action to address the anomaly. Display 1602 may include an interactive component whereby user 250 may select particular resources (for example, databases or clusters) to compare or evaluate.

In some examples, user 250 may select a particular resource/database or a specific anomaly, and display 1602 may provide specific data associated with the selected resource and/or anomaly. In some examples, display 1602 may include a graph depicting key performance metrics and/or forecast metrics associated with the anomaly (which may be displayed over a time period). From the data presented regarding the anomaly, user 250 may be able to identify an anomaly detection point 1604 of an anomaly (or deviation) and an anomaly resolution point 1606. In some examples, data and recommendations presented in display 1602 may be associated with an anomaly alert. This may allow user 250 detect a degraded state of a resource earlier than would otherwise be possible (in some examples, almost instantly after the anomaly detection point 1604), which may lead to avoidance or shortening of resource downtime.

In some examples, an enterprise user may navigate among a number of user interfaces (for example the user interfaces of FIGS. 8-16) to view high-level data resource utilization and to drill into specific usage issues and trends, which may assist with planning of further enterprise resource allocation(s). For example, the enterprise user may view utilization and growth analysis data on screens such as those shown in FIGS. 8-10 and select to proceed to a screen such as shown by FIG. 12 or 13 to view cost and utilization data of a specific database or cluster(s) if issues are noted. If the user then wants to compare performance of multiple databases/clusters, the user may navigate to a screen such as shown by FIG. 14. If the user wishes to view a forecast of a key metric or a recommended action, they may navigate to a screen such as shown by FIGS. 15 and 16. A user may then proceed to a screen such as shown by FIG. 11 to view recommended cost savings data for particular recommendations.

Figure 17:
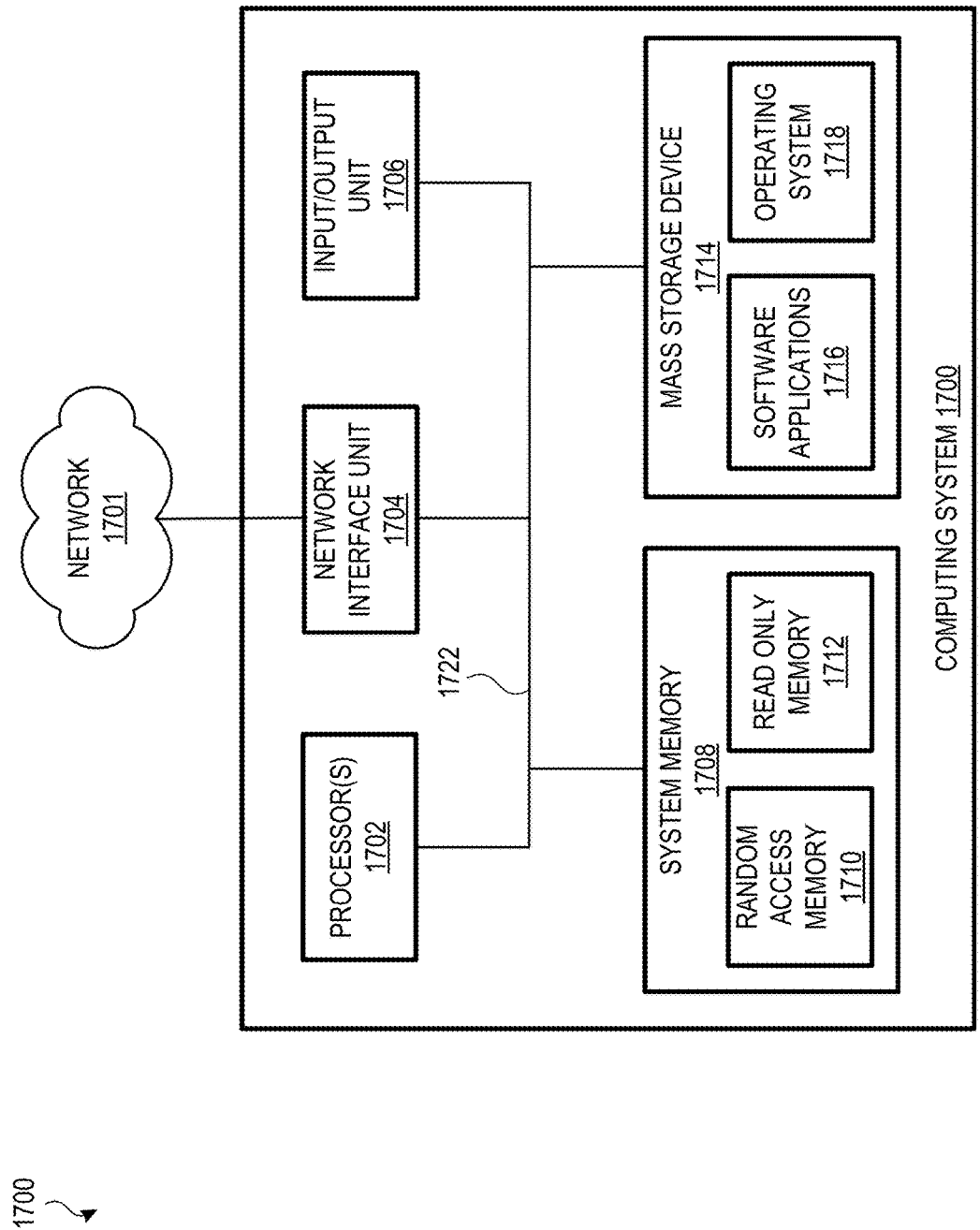
FIG. 17 illustrates an example block diagram of a computing system.

FIG. 17 illustrates an example block diagram of a virtual or physical computing system 1700. One or more aspects of the computing system 1700 can be used to implement the database usage footprint monitoring platform 104/202, store instructions described herein, and preform operations described herein.

In the embodiment shown, the computing system 1700 includes one or more processors 1702, a system memory 1708, and a system bus 1722 that couples the system memory 1708 to the one or more processors 1702. The system memory 1708 includes RAM (Random Access Memory) 1710 and ROM (Read-Only Memory) 1712. A basic input/output system that contains the basic routines that help to transfer information between elements within the computing system 1700, such as during startup, is stored in the ROM 1712. The computing system 1700 further includes a mass storage device 1714. The mass storage device 1714 is able to store software instructions and data. The one or more processors 1702 can be one or more central processing units or other processors.

The mass storage device 1714 is connected to the one or more processors 1702 through a mass storage controller (not shown) connected to the system bus 1722. The mass storage device 1714 and its associated computer-readable data storage media provide non-volatile, non-transitory storage for the computing system 1700. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1700.

According to various examples of the invention, the computing system 1700 may operate in a networked environment using logical connections to remote network devices through the network 1701. The network 1701 is a computer network, such as an enterprise intranet and/or the Internet. The network 1701 can include a LAN, a Wide Area Network (WAN), the Internet, wireless transmission mediums, wired transmission mediums, other networks, and combinations thereof. The computing system 1700 may connect to the network 1701 through a network interface unit 1704 connected to the system bus 1722. It should be appreciated that the network interface unit 1704 may also be utilized to connect to other types of networks and remote computing systems. The computing system 1700 also includes an input/output controller 1706 for receiving and processing input from a number of other devices, including a touch user interface display screen, or another type of input device. Similarly, the input/output controller 1706 may provide output to a touch user interface display screen or other type of output device.

As mentioned briefly above, the mass storage device 1714 and the RAM 1710 of the computing system 1700 can store software instructions and data. The software instructions include an operating system 1718 suitable for controlling the operation of the computing system 1700. The mass storage device 1714 and/or the RAM 1710 also store software instructions, that when executed by the one or more processors 1702, cause one or more of the systems, devices, or components described herein to provide functionality described herein. For example, the mass storage device 1714 and/or the RAM 1710 can store software instructions that, when executed by the one or more processors 1702, cause the computing system 1700 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of databases, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A system, comprising:
   a processor; and
   a memory coupled to the processor, the memory storing instructions, that, when executed by the processor, perform operations, comprising:

receiving, a plurality of times over a plurality of time periods, usage data associated with a plurality of heterogeneous databases from across an enterprise organization, wherein at least a portion of one or more of the plurality of heterogeneous databases are allocated to one or more of a plurality of functional groups within the enterprise organization, wherein each of the plurality of functional groups has a specified database requirement;

for each time period:
analyzing the received usage data, including calculating usage metrics associated with the plurality of heterogeneous databases; and
storing the calculated usage metrics in a database in association with a capture time of the usage data;
generating a user interface that displays a comparison of the usage metrics across the plurality of time periods, each time period being represented by a different capture time of the usage data, wherein at least a portion of the metrics are associated with the one or more of the plurality of functional groups;
identifying an alert event in the usage metrics, the alert event being generated in response to detection of a performance or cost condition identified based on the comparison of usage metrics across the plurality of time periods, the plurality of the heterogeneous databases, or the plurality of functional groups; and
outputting one or more automated recommendations via the user interface, the one or more automated recommendations including a recommendation to adjust a footprint of a particular type of database from among the heterogeneous databases allocated to a particular group of the plurality of functional groups.

2. The system of claim 1, wherein adjusting the footprint of the particular type of database is based, at least in part, on usage or cost and a resource savings analysis based on the recommendation.

3. The system of claim 1, wherein the operations further comprises outputting an alert associated with the alert event via the user interface.

4. The system of claim 1, wherein the specified database requirement comprises a required amount of data storage.

5. The system of claim 1, wherein the specified database requirement comprises a required type of data storage.

6. The system of claim 1, further comprising an artificial intelligence application, wherein the artificial intelligence application performs at least part of the analyzing operation.

7. The system of claim 1, wherein the usage metrics include a database cost estimation.

8. The system of claim 1, wherein the received usage data comprises database utilization data, database performance data, database storage data, and database cost data.

9. The system of claim 1, wherein the operation of generating the user interface comprises generating a display of a graphical representation of a database utilization data associated with one of the plurality of functional groups.

10. The system of claim 1, wherein the operations further comprise calculating a changed specified database requirement associated with one of the plurality of functional groups, wherein the changed specified database requirement is based, at least in part, on the received usage data.

11. The system of claim 1, wherein the operations further comprise receiving usage data from one or more enterprise data sources other than the plurality of heterogenous databases, the one or more enterprise data sources including at least one cloud storage provider.

12. A method, comprising:
receiving, a plurality of times over a plurality of time periods, usage data associated with a plurality of heterogeneous databases from across an enterprise organization, wherein at least a portion of one or more of the plurality of heterogeneous databases are allocated to one or more of a plurality of functional groups within the enterprise organization, wherein each of the plurality of functional groups has a specified database requirement;
for each time period:
analyzing the received usage data, including calculating usage metrics associated with the plurality of heterogeneous databases; and
storing the calculated usage metrics in a database in association with a capture time of the usage data;
generating a user interface that displays a comparison of the usage metrics across a plurality of time periods, each time period being represented by a different captured time of the usage data, wherein at least a portion of the metrics are associated with the one or more of the plurality of functional groups;
calculating a predicted value for the usage metrics; and
outputting one or more automated recommendations via the user interface, the one or more automated recommendations being based, at least in part, on the predicted value.

13. The method of claim 12, further comprising outputting an alert via the user interface, wherein the alert is based, at least in part, on the predicted value.

14. The method of claim 12, wherein the step of generating the user interface includes displaying a graphical representation of the predicted value over a time period.

15. The method of claim 12, wherein the step of calculating the predicted value is performed, at least in part, by an artificial intelligence application.

16. The method of claim 12, wherein the usage metrics include a database cost estimation, wherein the predicted value is based, at least in part, on the database cost estimation.

17. A method, comprising:
receiving, a plurality of times over a plurality of time periods, usage data associated with a plurality of heterogeneous databases from across an enterprise organization, wherein at least a portion of one or more of the plurality of heterogeneous databases are allocated to one or more of a plurality of functional groups within the enterprise organization, wherein each of the plurality of functional groups has a specified database requirement;
for each time period:
analyzing the received usage data, including calculating usage metrics associated with the plurality of heterogeneous databases; and
storing the calculated usage metrics in a database in association with a capture time of the usage data;
identifying an alert event in the usage metrics, the alert event being generated in response to detection of a performance or cost condition identified based on a comparison of usage metrics across the plurality of time periods, the plurality of the heterogeneous databases, or the plurality of functional groups;
determining one or more automated recommendations via the user interface, the one or more automated recommendations including a recommendation to adjust a footprint of a particular type of database from among the heterogeneous databases allocated to a particular group of the plurality of functional groups;

automatically initiating the carrying out of the one or more automated recommendations; and generating a user interface that displays the one or more automated recommendations and a comparison of the usage metrics across a plurality of time periods, each time period being represented by a different captured time of the usage data, wherein at least a portion of the metrics are associated with the one or more of the plurality of functional groups.

18. The method of claim 17, further comprising the step of calculating a predicted value associated with the received usage data, wherein the automated recommendation is based, at least in part, on the predicted value.

19. The method of claim 17, wherein the automated recommendation is based, at least in part, on the alert event.

20. The method of claim 17, wherein the step of determining the automated recommendation is performed, at least in part, by an artificial intelligence application.

21. The method of claim 17, wherein the usage metrics include a database cost estimation, wherein the automated recommendation is based, at least in part, on the database cost estimation.

* * * * *